US010739825B2

(12) United States Patent
Gilbert et al.

(10) Patent No.: US 10,739,825 B2
(45) Date of Patent: Aug. 11, 2020

(54) KEYBOARD ACCESSORY FOR A PORTABLE ELECTRONIC DEVICE

(71) Applicant: Apple Inc., Cupertino, CA (US)

(72) Inventors: Taylor Harrison Gilbert, Sunnyvale, CA (US); Kristine S. Tom, Santa Clara, CA (US); Elvis M. Kibiti, San Jose, CA (US); Jaime G. Chavez Ruiz Garza, Palo Alto, CA (US); Thomas R. Matzinger, Sunnyvale, CA (US); Zhengyu Li, Shanghai (CN); Charles A. Bates, III, San Jose, CA (US); Shih-Hsiang Hsiao, Shenzhen (CN); Johan E. Lyon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/277,997

(22) Filed: Feb. 15, 2019

(65) Prior Publication Data

US 2020/0089285 A1    Mar. 19, 2020

Related U.S. Application Data

(60) Provisional application No. 62/731,640, filed on Sep. 14, 2018.

(51) Int. Cl.
*G06F 1/16*     (2006.01)
*H05K 5/00*     (2006.01)
(Continued)

(52) U.S. Cl.
CPC ....... *G06F 1/1669* (2013.01); *H01H 13/7006* (2013.01)
(Continued)

(58) Field of Classification Search
CPC .... G06F 1/1669; G06F 1/1633; G06F 1/1637; G06F 1/1654
(Continued)

(56) References Cited

U.S. PATENT DOCUMENTS

| 8,937,803 | B2 * | 1/2015 | Hung | G06F 1/1632 |
| | | | | 361/679.08 |
| 9,013,863 | B2 * | 4/2015 | Hsu | H05K 7/1401 |
| | | | | 206/320 |

(Continued)

FOREIGN PATENT DOCUMENTS

| CN | 102880234 A | 1/2013 |
| CN | 103582353 A | 2/2014 |

(Continued)

OTHER PUBLICATIONS

International Patent Application No. PCT/US2019/023914—International Search Report and Written Opinion dated Jul. 5, 2019.

(Continued)

*Primary Examiner* — Anthony M Haughton
(74) *Attorney, Agent, or Firm* — Dickinson Wright RLLP

(57) ABSTRACT

An accessory device for an electronic device is described. The accessory device may include a cover section and a keyboard section. The cover section may include a receiving surface that engages the electronic device. The cover section may include electrical contacts designed to electrically couple with contacts on the electronic device. The cover section may include several magnets designed to magnetically couple with magnets within the electronic device. The keyboard section may include a keyboard and one or more channels designed to receive and position the electronic device in a usable configuration with the keyboard. Several magnets may surround each channel, and may magnetically couple with magnets within (and along an edge of) the electronic device. The magnetic circuits formed between the (Continued)

channel magnets and the device magnets may counter, or offset, forces that otherwise remove the electronic device from the channel in an undesired manner.

20 Claims, 17 Drawing Sheets

(51) Int. Cl.
*H05K 7/00* (2006.01)
*H01H 13/70* (2006.01)

(58) Field of Classification Search
USPC .............. 361/679.21–679.3, 679.41–679.44, 361/679.55, 679.56
See application file for complete search history.

(56) References Cited

U.S. PATENT DOCUMENTS

| | | | |
|---|---|---|---|
| 9,072,174 B2* | 6/2015 | Lin | ................ H05K 7/02 |
| 9,372,511 B2 | 6/2016 | Yeh et al. | |
| 9,600,034 B2* | 3/2017 | Kiple | |
| 9,778,702 B2 | 10/2017 | Song et al. | |
| 9,823,701 B2 | 11/2017 | MacDonald | |
| 2005/0139740 A1* | 6/2005 | Chen | ................ F16M 11/10 |
| | | | 248/286.1 |
| 2011/0096513 A1* | 4/2011 | Kim | ................ G06F 1/1626 |
| | | | 361/747 |
| 2013/0031289 A1* | 1/2013 | Yeh | ................ G06F 1/1632 |
| | | | 710/303 |
| 2013/0242490 A1* | 9/2013 | Ku | ................ G06F 1/1626 |
| | | | 361/679.3 |
| 2013/0279096 A1 | 10/2013 | Gengler | |
| 2014/0043743 A1* | 2/2014 | Liang | ................ G06F 1/1669 |
| | | | 361/679.09 |
| 2015/0041341 A1 | 2/2015 | Marshall et al. | |
| 2016/0179142 A1* | 6/2016 | Liang | ................ G06F 1/1656 |
| | | | 361/679.17 |
| 2016/0357224 A1* | 12/2016 | Song | ................ G06F 1/1667 |
| 2017/0068276 A1* | 3/2017 | Wagman | ................ G06F 1/1643 |
| 2017/0177037 A1 | 6/2017 | Koo et al. | |
| 2017/0192455 A1 | 7/2017 | Kim et al. | |
| 2017/0351298 A1 | 12/2017 | Li et al. | |
| 2018/0196473 A1 | 7/2018 | Smith et al. | |

FOREIGN PATENT DOCUMENTS

| | | |
|---|---|---|
| CN | 105824352 A | 8/2016 |
| CN | 106505344 A | 3/2017 |
| CN | 206147403 U | 5/2017 |
| JP | 2013025420 A | 2/2013 |

OTHER PUBLICATIONS

Chinese Patent for Utility Model No. ZL2019204161861—Utility Model Patentability Evaluation Report dated Jun. 19, 2020.

* cited by examiner

KEYBOARD ACCESSORY FOR A PORTABLE ELECTRONIC DEVICE

CROSS-REFERENCE TO RELATED APPLICATION(S)

This application claims the benefit of priority to U.S. Provisional Application No. 62/731,640, filed on Sep. 14, 2018, titled "KEYBOARD ACCESSORY FOR A PORTABLE ELECTRONIC DEVICE," the disclosure of which is incorporated herein by reference in their entirety.

FIELD

The following description relates to accessory devices. In particular, the following description relates to accessory devices designed to carry an electronic device (e.g., smartphone, tablet device). Accessory devices described herein may include both a cover and a keyboard.

BACKGROUND

Accessory devices are known to carry electronic devices. An accessory device may provide a protective outer cover for an electronic device.

SUMMARY

In one aspect, an accessory device for use with an electronic device is described. The accessory device may include a cover section that defines a receiving surface for the electronic device. The cover section may include electrical contacts located on the receiving surface. The electrical contacts can be configured to electrically couple to the electronic device. The accessory device may further include a cover magnet located in the cover section. The cover magnet can be capable of magnetically coupling with a device magnet in the electronic device. The accessory device may further include a keyboard section rotatably coupled to the cover section. The keyboard section may include a keyboard and a channel. The channel can be capable of receiving the electronic device when the electronic device is coupled to the cover section.

In another aspect, an accessory device for use with an electronic device is described. The accessory device may include a cover section that defines a receiving surface for the electronic device. The accessory device may further include a keyboard section rotatably coupled to the cover section. The keyboard section may include a keyboard. The keyboard section may further include a channel capable of receiving the electronic device. The channel may include a first diagonal wall and a second diagonal wall. The keyboard section may further include a first magnet located along the first diagonal wall. The keyboard section may further include a second magnet located along the second diagonal wall. In some instances, the first magnet and the second magnet magnetically couple with a device magnet of the electronic device when the electronic device is positioned in the channel.

In another aspect, an accessory device for use with an electronic device is described. The accessory device may include a keyboard section may include a keyboard and a channel. The channel can be capable of receiving the electronic device. The accessory device may further include a cover section rotatably coupled to the keyboard section. The cover may include a receiving surface for the electronic device. The cover may further include electrical contacts located on the receiving surface. The cover may further include a flexible circuit coupled to the electrical contacts. The accessory device may further include a panel embedded in the cover section. The panel may include an embedded magnet capable of magnetically coupling with a device magnet of the electronic device when the electronic device is positioned on the receiving surface. The panel may further include a recess. In some instances, the flexible circuit is positioned in the recess.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
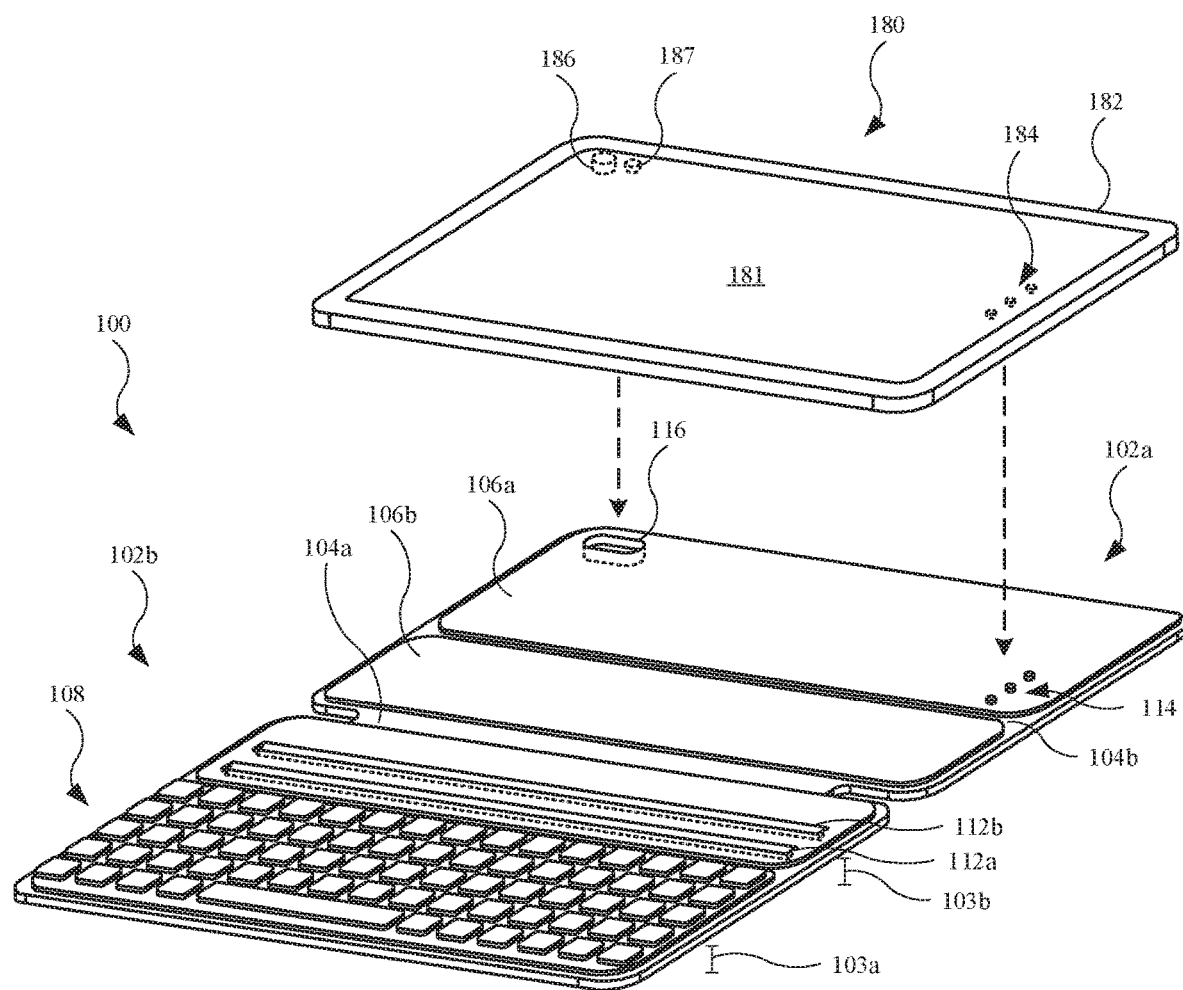
FIG. 1 illustrates an isometric view of an embodiment of an accessory device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to an accessory device designed for use with electronic devices, including portable computing devices (such as tablet computing devices, smartphones, and laptop computing devices). Accessory devices described herein may be referred to as portable accessory devices, accessory covers, accessory cases, cases, folios, as non-limiting examples. Accessory devices described herein may include a cover having segments foldable with respect to each other, as well as a keyboard coupled with the cover in a manner that allows rotational movement between the cover and the keyboard. The cover may further include electrical contacts designed to engage electrical contacts of the electronic device and place the electronic device in electrical communication with the accessory device, including the keyboard.

The keyboard may include several keys arranged in a QWERTY configuration, as a non-limiting example. Further, the keyboard may include one or more channels (also referred to as troughs or trenches). Each channel is designed to receive part of the electronic device (when coupled with the cover) and position the electronic device in a manner that allows a user to interact with the electronic device (in particular, a display of the electronic device) and the keyboard. Also, each channel may include one or more magnets designed to magnetically couple with magnets in the electronic device, which promotes retention of the electronic device in the channel.

While traditional accessory devices include mechanical interlocking features to couple the electronic device with the accessory device, the accessory devices described herein may couple with and retain electronic devices through magnets. In this regard, the cover and the keyboard may include several embedded magnets. Further, the respective magnets in the cover and the keyboard can magnetically couple to each other, thereby placing the cover in contact with the keyboard.

These and other embodiments are discussed below with reference to FIGS. 1-21. However, those skilled in the art will readily appreciate that the detailed description given herein with respect to these Figures is for explanatory purposes only and should not be construed as limiting.

FIG. 1 illustrates an isometric view of an embodiment of an accessory device 100, in accordance with some described embodiments. The accessory device 100 is designed as a complementary device for an electronic device 180. As shown, the accessory device 100 may include a first section 102a and a second section 102b connected to the first section 102a. The accessory device 100 may include a hinge 104a that connects the first section 102a with the second section 102b. The hinge 104a allows the first section 102a to rotate or pivot with respect to the second section 102b, and vice versa. The hinge 104a may include a flexible material (such as polyurethane, as a non-limiting example) that defines an outer layer (or layers) extending across both the first section 102a and the second section 102b.

The first section 102a, also referred to as a cover, a cover portion, a cover section, an electronic device cover, or a segmented cover, may define a receiving surface for the electronic device 180. The first section 102a may include a first segment 106a and a second segment 106b that define that collectively define the receiving surface. The first segment 106a is separated from the second segment 106b by a hinge 104b positioned between the first segment 106a and the second segment 106b. The hinge 104b allows rotational movement of the first segment 106a relative to the second segment 106b, and vice versa. The hinge 104b may be formed from the aforementioned outer layer(s) used to form the hinge 104a. In some embodiments, the first segment 106a and the second segment 106b are the same size, generally. In the embodiment shown in FIG. 1, the first segment 106a is larger than the second segment 106b. Also, each of the first segment 106a and the second segment 106b may include a microfiber layer (not labeled). In some instances, the microfiber layer is restricted to the first segment 106a and the second segment 106b such that the microfiber layer does not cover the hinge 104b.

The second section 102b, also referred to as a keyboard section or a keyboard cover, may include a keyboard 108. The keyboard 108 may include several keys (not labeled) arranged in a QWERTY configuration, as a non-limiting example. The second section 102b may further include one or more channels designed to provide a location that is below or sub-flush with respect to a location of the second section 102b that surrounds the one or more channels. For example, the second section 102b may include a first channel 112a and a second channel 112b. The first channel 112a and the second channel 112b are designed to receive the electronic device 180 (or a portion of the electronic device 180) in order to place and position the electronic device 180 in a manner such that the electronic device 180 can be used with the keyboard 108. Also, the second section 102b may include a dimension 103a measured from a rear surface of the second section 102b to a key (not labeled) of the keyboard 108. The second section 102b may include a dimension 103b measured from a rear surface of the second section 102b to a section that surrounds the first channel 112a and the second channel 112b. The dimension 103a may be the same as, or substantially similar to, the dimension 103b, such that the keys of the keyboard 108 are planar with respect to the surface surrounding the first channel 112a and the second channel 112b. In this manner, when the electronic device 180 is coupled to the first section 102a and the first section 102a is folded over the second section 102b, the electronic device 180 may lie flat, or horizontal, on the second section 102b.

The first section 102a may include electrical contacts 114 designed to engage electrical contacts 184 (shown as dotted lines) located in openings (not labeled) of a housing 182 of the electronic device 180, and place the accessory device 100 in communication (including electrical communication) with electronic device 180, and in particular, the keyboard 108. When the accessory device 100 is in communication with the electronic device 180, the keyboard 108 can be used to provide inputs and commands to the electronic device 180 to control a display 181 of the electronic device 180. As shown, the electrical contacts 114 are located on the first segment 106a. However, other locations are possible (such as the second segment 106b). Generally, the electrical contacts 114 can be at any location corresponding to the location of the electrical contacts 184 such that the electronic device 180 lies within an outer perimeter of the first section 102a when the electronic device 180 is placed on the receiving surface of the first section 102a. Also, while the electrical contacts 114 include three electrically conductive pins, the number of pins of the electrical contacts 114 may vary. For example, in some embodiments (not shown in FIG. 1), the electrical contacts 114 include one, two, or four our more contacts. Also, while the electrical contacts 114 represent a physical/direct communication between the accessory device 100 and the electronic device 180, the accessory device 100 and the electronic device 180 may also be in communication via wireless communication, such as Bluetooth® communication, as a non-limiting example.

The first section 102a may further include an opening 116, or through hole, designed to receive a camera assembly 186 and a flash module 187 (shown as dotted lines) extending from the housing 182, thereby allowing the electronic device 180 to capture images while coupled to the first section 102a. Although not shown, the electronic device 180 may include a microphone positioned between the camera assembly 186 and the flash module 187. As shown, the opening 116 is located on the first segment 106a. However, other locations are possible. Generally, the opening 116 can be at any location corresponding to the location of the camera assembly 186 and the flash module 187 such that the electronic device 180 lies within an outer perimeter of the first section 102a when the electronic device 180 is in contact with the receiving surface of the first section 102a.

Figure 2:
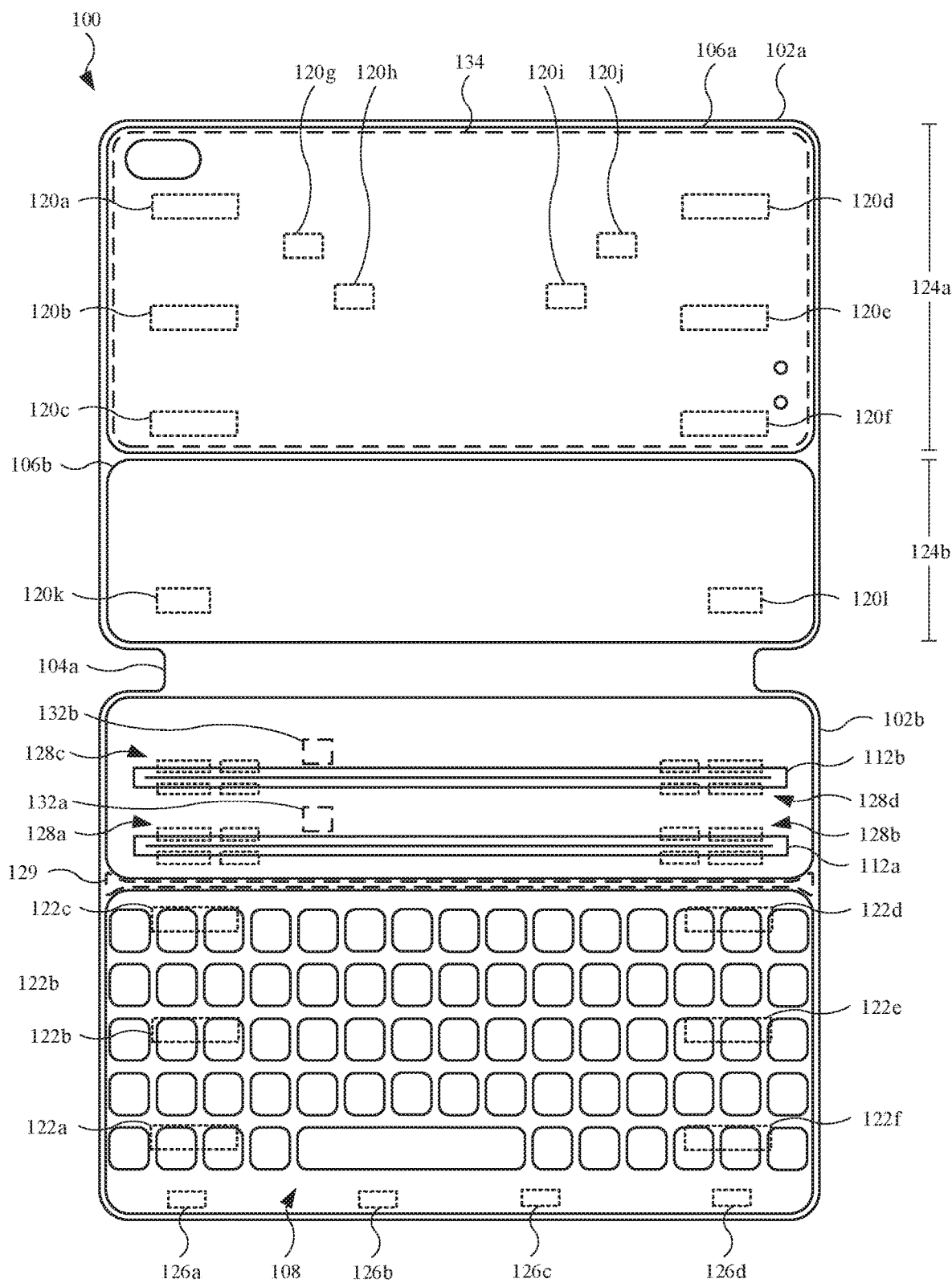
FIG. 2 illustrates a plan view of the accessory device shown in FIG. 1, showing various internal features of the accessory device.

FIG. 2 illustrates a plan view of the accessory device 100 shown in FIG. 1, showing various internal features of the accessory device 100. The first segment 106a of the first section 102a may include several magnets designed to magnetically couple with magnets in the electronic device 180 (shown in FIG. 1) to retain the electronic device 180 against the first section 102a. For example, the first segment 106a may include a magnet 120a, a magnet 120b, and a magnet 120c capable of magnetically coupling with magnets (or other magnetically attractable elements) in the electronic device 180, as well as a magnet 122a, a magnet 122b, and a magnet 122c, respectively, located in the second section 102b. The first segment 106a may further include a magnet 120d, a magnet 120e, and a magnet 120f capable of magnetically coupling with magnets (or other magnetically attractable elements) in the electronic device 180, as well as a magnet 122d, a magnet 122e, and a magnet 122f, respectively, located in the second section 102b. When the aforementioned magnets are not magnetically coupled with the electronic device 180, the magnets in the first section 102a can magnetically couple with magnets in corresponding locations in the second section 102b, by, for example, rotating the first section 102a about the hinge 104a. Further, the first section 102a can be rotated about the hinge 104a such that the front surface (shown in FIG. 2) covers a front surface (shown in FIG. 2) of the second section 102b. Alternatively, the first section 102a can be rotated about the hinge 104a such that a back surface (not shown in FIG. 2) covers a back surface (not shown in FIG. 2) of the second section 102b.

The first section 102a may include additional magnets used to magnetically couple with the electronic device 180. For example, the first section 102a may include a magnet 120g, a magnet 120h, a magnet 120i, and a magnet 120j. It should be noted that the aforementioned magnets shown in FIG. 2 may represent a group of two or more magnets. Also, the magnets located in the first section 102a may be referred to as cover magnets, as the first section 102a may be referred to as a cover or a cover section. Also, the magnets located in the second section 102b may be referred to as keyboard magnets, as the second section 102b may be referred to as a keyboard or keyboard section. It should also be noted that additional magnets in the first section 102a and second section 102b are possible.

An external magnetic field (not shown in FIG. 2) provided by each magnet in the first segment 106a can be used to magnetically attract magnets in the electronic device 180 and retain the electronic device 180 (shown in FIG. 1) against the first section 102a. Further, this magnetic attraction can withstand gravitational forces acting on the electronic device 180, and the first section 102a can retain the electronic device 180 even when gravity is acting to remove the electronic device 180. In this regard, the first section 102a may not require mechanical retaining features, such as sidewalls and/or locks, designed to wrap around and/or interlock with the electronic device 180 to retain the electronic device 180. However, in some instances, the second segment 106b may optionally include magnets, such as a magnet 120k and a magnet 120l, that each provide an additional external magnetic field (not shown in FIG. 2) used to retain the electronic device 180 with the first section 102a by magnetic attraction. The magnet 120k and/or the magnet 120l may represent a group of two or more magnets. Also, a panel 134 (shown as a dotted line) may include some of the magnets in the first segment 106a. In this regard, the magnets in the first segment 106a may be embedded in the panel 134. This will be shown below.

As described above, the size of the first segment 106a is different from the size of the second segment 106b. In particular, a dimension 124a of the first segment 106a is greater than a dimension 124b of the second segment 106b. This may facilitate positioning the first section 102a in a desired manner to support the electronic device 180. This will be shown and described below.

The second section 102b may further include magnets along an edge (of the second section 102b). For example, the second section 102b may include a magnet 126a, a magnet 126b, a magnet 126c, and a magnet 126d. These magnets are designed to magnetically couple with magnets (or magnetically attractable materials) in the electronic device 180 in order to retain the electronic device 180 with the second section 102b along the edge.

The second section 102b may include additional magnets. For example, the second section 102b may include a magnetic assembly 128a and a magnetic assembly 128b (both shown as dotted lines), with each magnetic assembly including two or more magnets positioned around the first channel 112a. The magnetic assembly 128a and the magnetic assembly 128b are designed to magnetically couple with magnets (not shown in FIG. 2), or magnetically attractable materials, in the electronic device 180 in order to retain a portion of the electronic device 180 within the first channel 112a. The second section 102b may further include a magnetic assembly 128c and a magnetic assembly 128d (both shown as dotted lines), with each magnetic assembly including two or more magnets positioned around the second channel 112b. The magnetic assembly 128c and the magnetic assembly 128d are designed to magnetically couple with magnets (not shown in FIG. 2), or magnetically attractable materials, in the electronic device 180 in order to retain a portion of the electronic device 180 within the second channel 112b.

To provide additional support, the second section 102b may include a support member 129 that extends laterally beyond the shell to opposing edges of the keyboard 108 and the section associated with the first channel 112a and the second channel 112b. Also, the second section 102b may include a shell (shown later) that provides structural support to the keyboard 108, the first channel 112a, and the second channel 112b. However, the shell may not extend (laterally) to opposing edges of the keyboard 108, and may include cut outs, or removed section, in locations corresponds to the channels of the second section 102b.

It may be advantageous to selectively activate or deactivate the keyboard 108 based upon the position of the electronic device 180 relative to the accessory device 100. In this regard, the accessory device 100 may include sensors designed to detect an external magnetic field generated from magnets in the electronic device 180 to determine the position of the electronic device 180. For example, the accessory device 100 may include a first sensor 132a and a second sensor 132b. The first sensor 132a and the second sensor 132b are designed to detect when the electronic device 180 is positioned in the first channel 112a and the second channel 112b, respectively. In some embodiments, the first sensor 132a and the second sensor 132b are Hall Effect sensors designed to detect an external magnetic field generated by a magnet in the electronic device 180.

Figure 3:
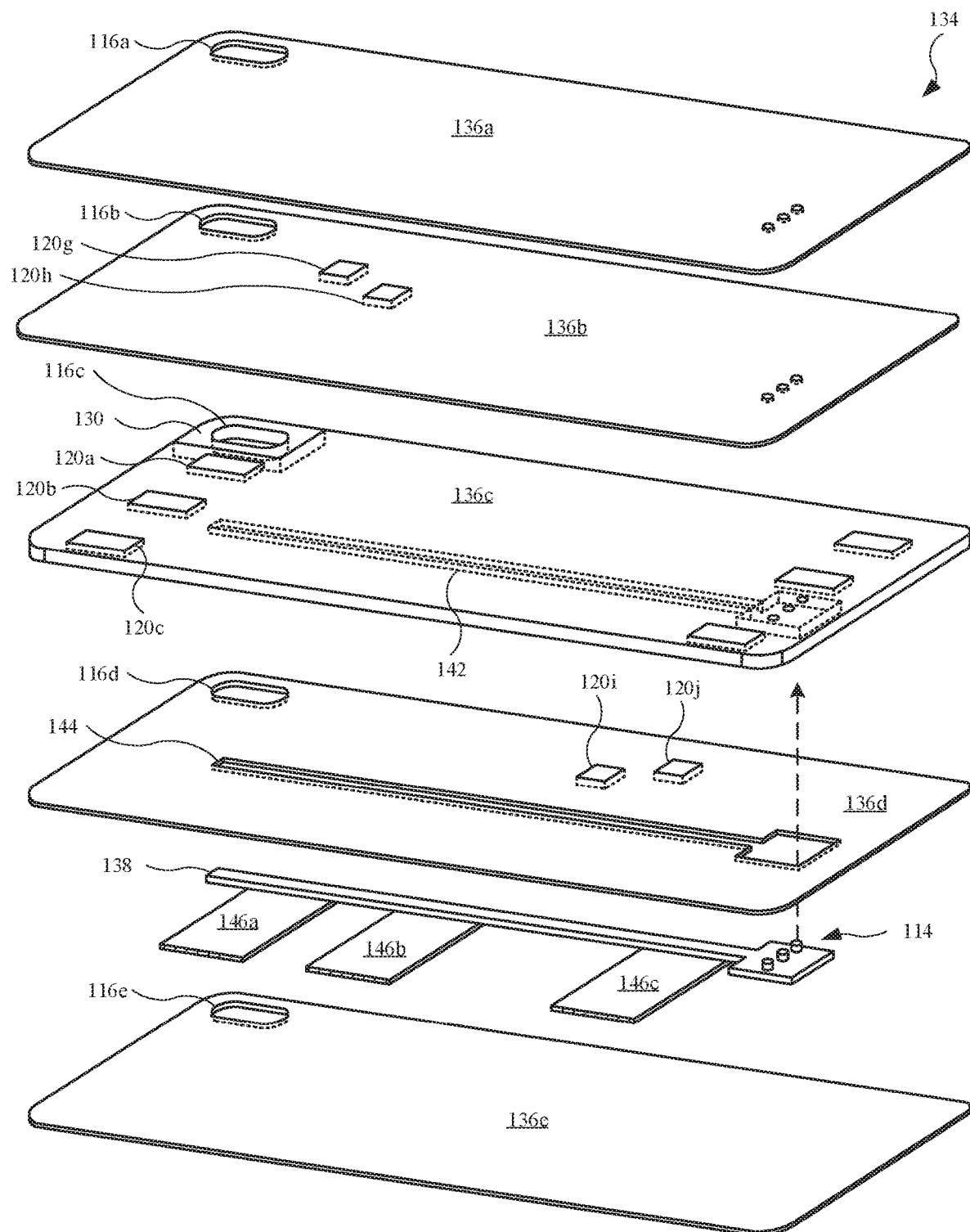
FIG. 3 illustrates an exploded view of the panel, showing various features of the panel as well as other components located in the first section.

FIG. 3 illustrates an exploded view of the panel 134, showing various features of the panel 134 as well as other components located in the first section 102a (shown in FIGS. 1 and 2). The panel 134 may include a first layer 136a, a second layer 136b, a third layer 136c, a fourth layer 136d, and a fifth layer 136e. As shown, the first layer 136a and the fifth layer 136e surround the second layer 136b, the third layer 136c, and the fourth layer 136d. At least some of the layers may include glass fiber, and at least some layers may include foam. For example, the first layer 136a, the second layer 136b, the fourth layer 136d, and the fifth layer 136e may include glass fiber. Some layers may include a combination of glass fiber and foam. For example, the third layer 136c may include a foam layer as well as glass fiber. Furthermore, the relative densities of glass fiber may vary among the layers. For example, the first layer 136a and the fifth layer 136e may include a relatively high-density glass fiber, while the second layer 136b, the third layer 136c, and the fourth layer 136d may include a relatively low-density glass fiber. In this regard, the first layer 136a and the fifth layer 136e are relatively rigid as compared to the second layer 136b, the third layer 136c, and the fourth layer 136d. Also, the third layer 136c may be referred to as a central layer or a foam layer. Also, while FIG. 3 shows a discrete number of layers that define the panel 134, the number of panels that form the panel 134 may vary in other embodiments.

The first layer 136a, the second layer 136b, the third layer 136c, the fourth layer 136d, and the fifth layer 136e may include a first opening 116a, a second opening 116b, a third opening 116c, a fourth opening 116d, and a fifth opening 116e, respectively. When assembled, the aforementioned openings at least partially define the opening 116 of the first section 102a (shown in FIG. 1). The panel 134 may include a reinforcement layer 130 bonded to the third layer 136c at a corner. The reinforcement layer 130 may include glass or another rigid material. Also, the reinforcement layer 130 may define the third opening 116c as well as the opening 116 of the first section 102a (shown in FIG. 1). In this manner, the panel 134 can be strengthened in the corner to offset the void of material due to the opening 116, and due to the relatively low-density foam material.

The third layer 136c is designed to carry the magnets in the first segment 106a (shown in FIG. 2). For example, the third layer 136c carries the magnet 120a, the magnet 120b, and the magnet 120c. Additional magnets (not labeled) are carried by the third layer 136c. The third layer 136c can undergo a machining operation to form pockets, or openings, to receive each of the magnets. Further, additional layers may carry magnets. For example, the second layer 136b may carry the magnet 120g and the magnet 120h, while the fourth layer 136d may carry the magnet 120i and the magnet 120j. Other combinations are possible. The layers that carry the magnets may place the magnets in closer proximity to magnets, or magnetic elements, external to the electronic device 180 (shown in FIG. 1) in order to promote magnetic coupling with magnets in the electronic device 180.

The electrical contacts 114 are carried by a circuit board 138. The circuit board 138 may include a printed circuit board or a flexible circuit board. In order for the panel 134 to accommodate the circuit board 138, the third layer 136c may include a recess 142 (shown as dotted lines) that receives the circuit board 138. The recess 142 defines a cavity, or partial opening, that does not fully extend through the third layer 136c, with exception of openings (not labeled) through which the electrical contacts 114 pass when the circuit board 138 is positioned in the recess 142. Further, the fourth layer 136d may include an opening 144 through which the circuit board 138 passes. When the third layer 136c is assembled with the fourth layer 136d, the opening 144 is aligned with the recess 142. Further, when the third layer 136c is assembled with the second layer 136b and the second layer 136b is assembled with the first layer 136a, the electrical contacts 114 pass through openings (not labeled) in the first layer 136a.

The electrical contacts 114 are designed to couple with the electronic device 180 (shown in FIG. 1) such that the keyboard 108 (shown in FIGS. 1 and 2) is in communication with the electronic device 180. In order to complete the communication pathway, electrically conductive material can electrically couple with the circuit board 138 as well as a circuit board(s) in the second section 102b (shown later). For example, a first conductive material 146a, a second conductive material 146b, and a third conductive material 146c are electrically coupled to the circuit board 138. The first conductive material 146a, the second conductive material 146b, and the third conductive material 146c may include an electrically conductive fabric. The first conductive material 146a, the second conductive material 146b, and the third conductive material 146c may extend from the circuit board 138, through the hinge 104a (shown in FIG. 1), and into the second section 102b (shown in FIG. 1) to electrically with the keyboard 108 (shown in FIG. 1) via a circuit board (not shown).

Although not shown, several adhesive layers may be used to adhesively secure parts together. For example, an adhesive layer may adhesively secure the circuit board 138 to the third layer 136c at the recess 142. Also, several caps, or covers, may overlay the some components in order to conceal the presence of the components. For example, a glass fiber cap may cover the first conductive material 146a, the second conductive material 146b, and/or the third conductive material 146c in order to hide the conductive material(s). This may be useful when a polyurethane layer covers an outer perimeter of the accessory device 100 (shown in FIGS. 1 and 2).

Figure 4:
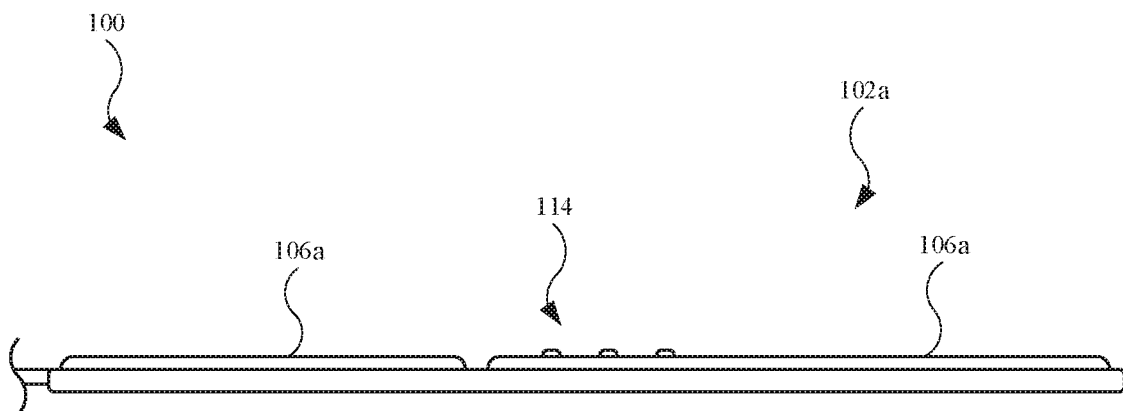
FIG. 4 illustrates a side view of the first section of the accessory device, showing the electrical contacts protruding from the first segment.

FIG. 4 illustrates a side view of the first section 102a of the accessory device 100, showing the electrical contacts 114 protruding from the first segment 106a. The first segment 106a and the second segment 106b may include a microfiber layer that covers a compressible material. In this regard, the first segment 106a and the second segment 106b may compress when the electronic device 180 (shown in FIG. 1) is placed on the first section 102a and in contact with the electrical contacts 114.

Figure 5:
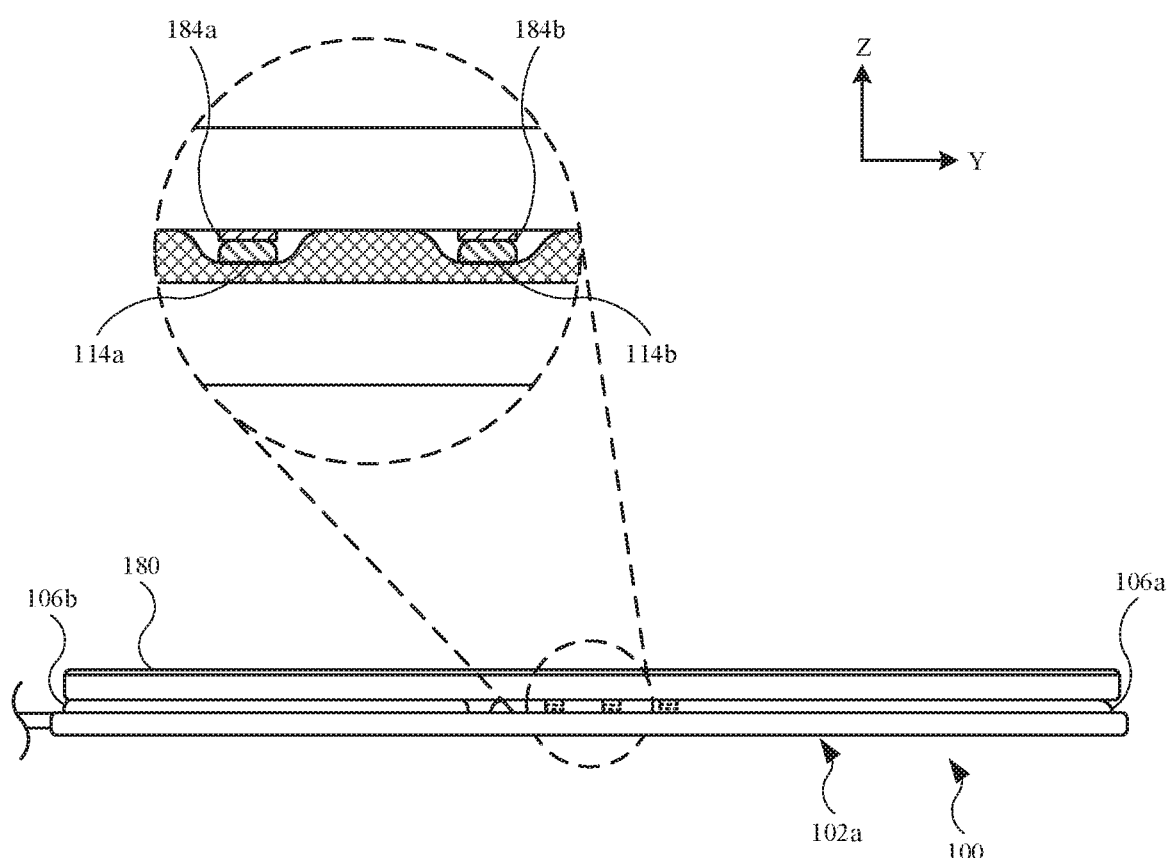
FIG. 5 illustrates a side view of the first section shown in FIG. 4, showing the electronic device positioned on the first section.

FIG. 5 illustrates a side view of the first section 102a shown in FIG. 4, showing the electronic device 180 positioned on the first section 102a. As shown, the first segment 106a and the second segment 106b compress from the weight of the electronic device 180. Also, a first electrical contact 114a and a second electrical contact 114b (both part of the electrical contacts 114 of the accessory device 100) are engaged with a first electrical contact 184a and a second electrical contact 184b (both part of the electrical contacts 184 of the electronic device 180), respectively, thereby placing the accessory device 100 in communication with the electronic device 180. The compression of the first segment 106a causes the first electrical contact 114a and the second electrical contact 114b to move along the Z-axis such that the first electrical contact 114a and the second electrical contact 114b are sub-flush with respect to a surface of the first segment 106a (or at least co-planar with respect to the surface of the first segment 106a). This prevents the electronic device 180 from resting along some non-horizontal plane on the first section 102a. Also, when the electronic device 180 or another object (such as a digit of a user) slides laterally across the first segment 106a to engage at least one of the electrical contacts 114, the compression of the first segment 106a and the second segment 106b prevent the electrical contact 114 from snagging and interlocking with the electronic device 180 or the other object, thereby preventing damage to the electronic device 180 and/or the accessory device 100.

Figure 6:
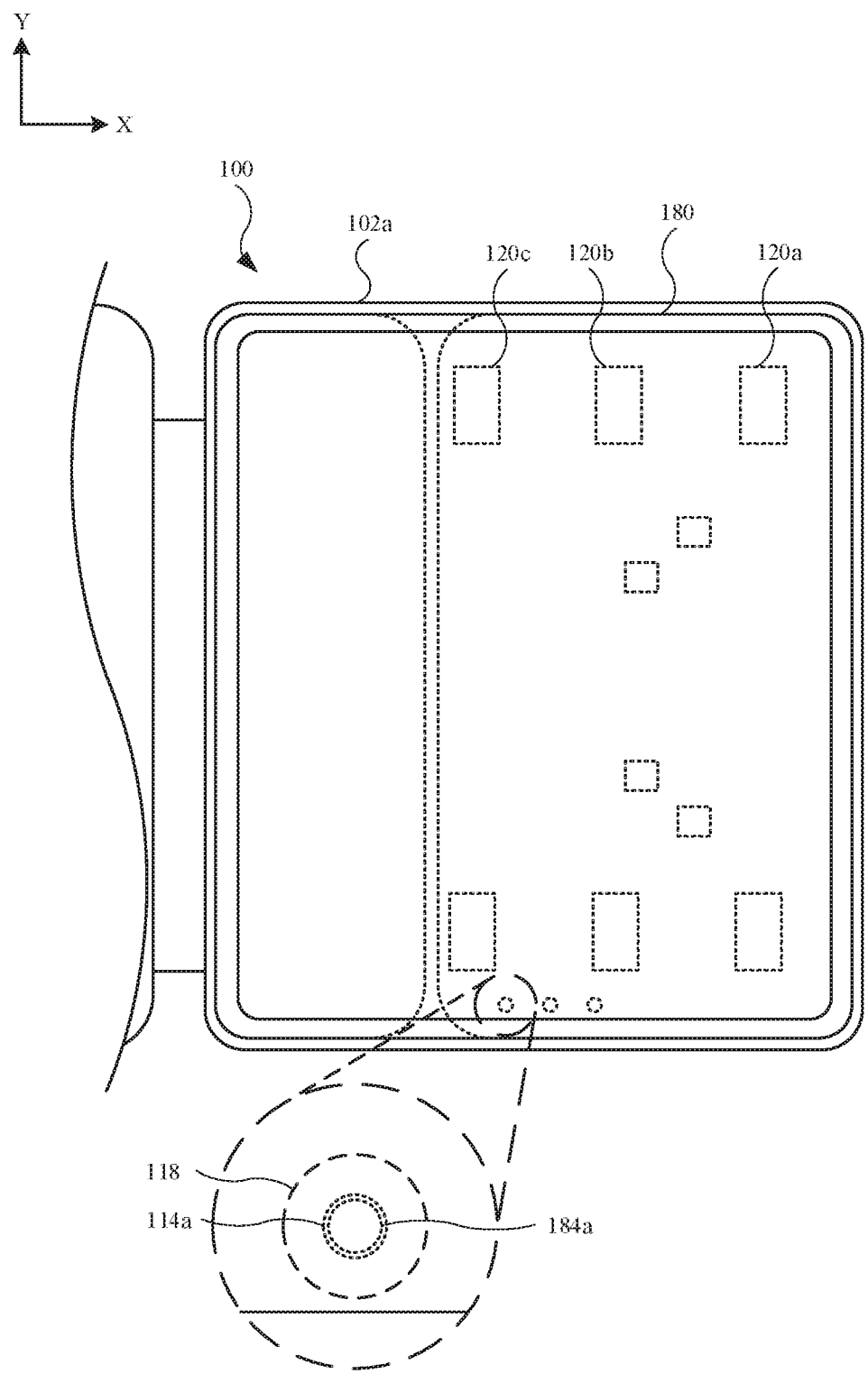
FIG. 6 illustrates a plan view of the electronic device positioned on the first section of the accessory device.

FIG. 6 illustrates a plan view of the electronic device 180 positioned on the first section 102a of the accessory device 100. The magnets of the accessory device 100 are magnetically coupled with at least some magnets (not shown in FIG. 6) of the electronic device 180 to form multiple magnetic circuits. Although not shown, the magnets in the electronic device 180 are generally locations corresponding to magnets in the accessory device 100. The magnetic attraction between the magnets may counter some lateral movement of the electronic device 180 with respect to the first section 102a of the accessory device 100. Further, the magnetic attraction between the magnets may cause the electronic device 180 to return to its initial position (shown in FIG. 6) on the first section 102a. For example, as shown in the enlarged view, the first electrical contact 184a of the electronic device 180 is positioned over the first electrical contact 114a of the accessory device 100. The first electrical contact 114a of the accessory device 100 includes a diameter such that a shift of the electronic device 180 along the X- and/or the Y-axis that causes a corresponding lateral shift of the first electrical contact 184a of the electronic device 180. However, if the shift causes the first electrical contact 184a to move to a circumference 118 around the first electrical contact 114a, but no further, the magnetic attraction causes the electronic device 180, and in particular, the first electrical contact 184a, to return to its initial position (shown in FIG. 6). The circumference 118 is a function of the size of the first electrical contact 114a as well as the size, shape and location of the magnets (including the magnet 120a, the magnet 120b, and the magnet 120c, along with additional magnets (not labeled) located in the first section 102a. The remaining electrical contact(s) of the accessory device 100 may exhibit a similar relationship.

Figure 7:
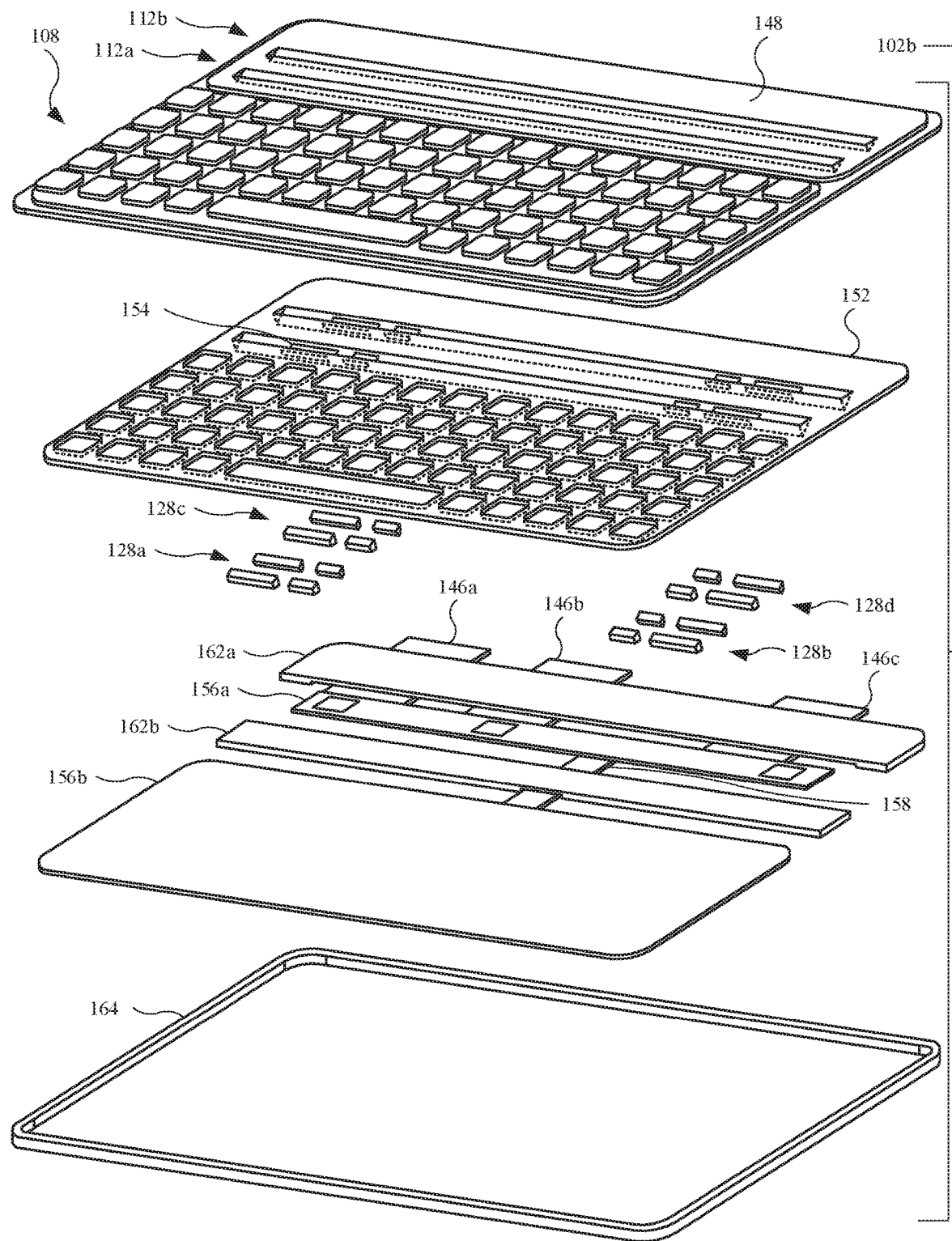
FIG. 7 illustrates an exploded view of the second section, showing various features of the second section.

FIG. 7 illustrates an exploded view of the second section 102b, showing various features of the second section 102b. The second section 102b may include an outer layer 148 that covers the keyboard 108 (including the keys), the first channel 112a, and the second channel 112b. In some embodiments, the outer layer 148 includes polyurethane. Also, although not shown, the outer layer 148 may extend across the first section 102a (shown in FIG. 1).

The second section 102b may further include a shell 152. The shell 152 may provide structural rigidity to the second section 102b. In this regard, the shell 152 may be formed from plastic or other rigid material(s). As shown, the shell 152 includes several openings (not labeled) for the keys of the keyboard 108. Also, the shell 152 may include two pairs of diagonal walls (not labeled), with one pair of diagonal walls defining the first channel 112a, and another pair of diagonal walls defining the second channel 112b. This will be further shown and discussed below. Each diagonal wall may include several openings to accommodate a magnetic assembly. For example, the shell 152 may include openings 154 that receive the magnets of the magnetic assembly 128a. Although not labeled, the shell 152 includes openings that receive the magnets of the magnetic assembly 128b, the magnetic assembly 128c, and the magnetic assembly 128d.

The shell 152 may include additional openings (similar to the openings 154) to accommodate the remaining magnets of the magnetic assemblies associated with the channels.

The second section 102b may further include a circuit board 156a. The circuit board 156a is electrically coupled with the first conductive material 146a, the second conductive material 146b, and the third conductive material 146c. The circuit board 156a may include one or more processor circuits (not labeled) to control and process inputs to keys of the keyboard 108. In this regard, the second section 102b may include a circuit board 156b associated with the keyboard 108. The circuit board 156b can be electrically coupled with the circuit board 156a by a flexible circuit 158. The circuit board 156a may also send commands to the electronic device 180 (shown in FIG. 1), and control and process inputs received from the electronic device 180. The circuit board 156a may electrically couple with, and receive inputs from, the first sensor 132a and the second sensor 132b (shown in FIG. 2). As a result, the processor circuits of the circuit board 156a may provide commands to selectively activate and deactivate the keyboard 108 based on received inputs from the first sensor 132a and the second sensor 132b.

In order to provide additional structural support, the second section 102b may include several blocks. For example, the second section 102b may include a first block 162a and a second block 162b. The first block 162a and the second block 162b may include glass fiber blocks that provide added stiffness to the second section 102b while limiting the amount of weight added to the second section 102b. As shown, the first block 162a may include a recess (not labeled) that receives the circuit board 156a.

The second section 102b may further include an enclosure 164 that provides a protective rear cover to the second section 102b. The enclosure 164 may include a back wall and sidewalls (not labeled) that define an internal volume to house several components shown in FIG. 7. Although not shown, an outer layer, which may include polyurethane, may cover the enclosure 164. Several additional materials may be included. For example, a thermoplastic shield may cover the first conductive material 146a, the second conductive material 146b, and the third conductive material 146c in order to provide ingress protection and electrical insulation.

Figure 8:
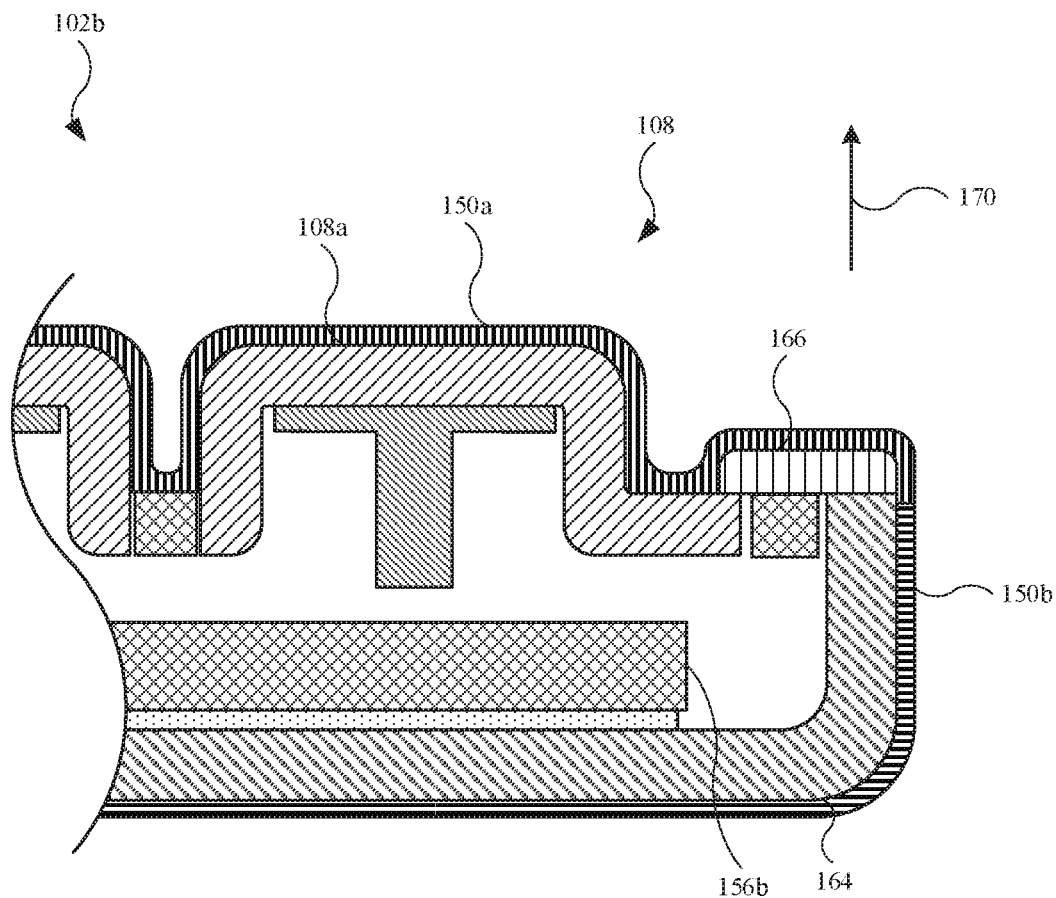
FIG. 8 illustrates a cross sectional view of the second section, showing a stop mechanism engaged with a key of the keyboard.

FIG. 8 illustrates a cross sectional view of the second section 102b, showing a stop mechanism 166 engaged with a key 108a of the keyboard 108. The key 108a can be depressed in a manner that causes contact with the circuit board 156b, thereby generating a command. When the key 108a is released, the key 108a travels in a direction of an arrow 170, and returns to an initial position. The stop mechanism 166 can engage the key 108a to prevent additional, unwanted travel in the direction of the arrow 170. Also, as shown, a first outer layer 150a combines with a second outer layer 150b to cover the keyboard 108 and the enclosure 164. Also, as shown, the circuit board 156b can be adhesively secured to the enclosure 164.

FIGS. 9A-9D show various implementations of a channel that can be used in an accessory device, such as the accessory device 100 (shown in FIG. 1). The channels shown and described in FIGS. 9A-9D can substitute for the first channel 112a and/or the second channel 112b (shown in FIG. 1). Also, at least some features shown and described in FIG. 9A-9D may be combined with each other.

Figure 9A:
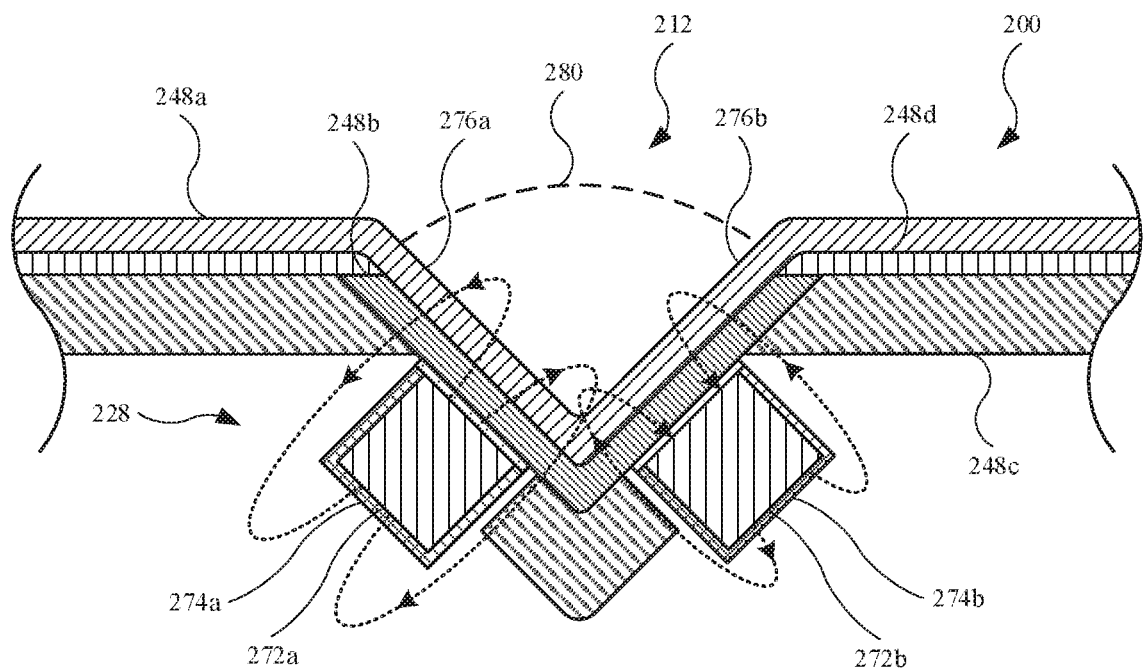
FIG. 9A illustrates a cross sectional view of an accessory device, showing various layers and components of a channel of the accessory device, in accordance with some described embodiments.

FIG. 9A illustrates a cross sectional view of an accessory device 200, showing various layers and components of a channel 212 of the accessory device 200, in accordance with some described embodiments. The accessory device 200 may include a first layer 248a, or outer layer, which may include a polyurethane layer. The accessory device 200 may further include a second layer 248b, formed from a rigid material such as glass fiber (as a non-limiting example). The accessory device 200 may further include a third layer 248c, which may be part of a shell used in a second section of an accessory device. For example, the third layer 248c may any features described for the shell 152 (shown in FIG. 7). The channel 212 may be defined by the first layer 248a, the second layer 248b, and the third layer 248c. The accessory device 200 may include a layer 248d that terminates at the channel 212. The layer 248d may include a woven fabric material, such as taffeta.

The third layer 248c may include openings (not labeled) in which magnets of a magnetic assembly 228 are positioned. For example, the magnetic assembly 228 may include a first magnet 272a and a second magnet 272b. As shown, the first magnet 272a and the second magnet 272b surround the channel 212. In this regard, the first magnet 272a and the second magnet 272b may be referred to as channel magnets. The first magnet 272a and the second magnet 272b may adhesively secure with the second layer 248b by an adhesive (not labeled). Each magnet may include a cap formed for a material (such as steel). For example, the first magnet 272a includes a cap 274a and the second magnet 272b includes a cap 274b. Although not shown, the third layer 248c may include additional openings, and the magnetic assembly 228 may include additional magnets, with each additional magnet positioned in an additional opening of the third layer 248c. The arrangement may be similar to the openings 154 of the shell 152 (shown in FIG. 7) and the magnetic assembly 128a (shown in FIG. 7). Generally, the number of openings is the same as the number of magnets of a magnetic assembly.

The first layer 248a and the second layer 248b are relatively thin to allow external magnetic fields (shown as dotted lines) of the first magnet 272a and the second magnet 272b to pass through the first layer 248a, the second layer 248b, and the adhesive. This allows the first magnet 272a and the second magnet 272b to magnetically couple with a magnet(s) in an electronic device (such as the electronic device 180, shown in FIG. 1). However, the second layer 248b should be relatively rigid to maintain the first magnet 272a and the second magnet 272b in a fixed position, as the first magnet 272a and the second magnet 272b may be magnetically attracted to each other.

The magnets of the magnetic assembly 228 can be arranged in different configurations. For example, the first magnet 272a and the second magnet 272b can be arranged to form a Halbach array in which the external magnetic field is additive, or augmented, at a location associated with the channel 212, while the external magnetic field is significantly reduced, or even canceled, on locations internally within the accessory device 200 that are not associated with the channel 212. This described arrangement may enhance the magnetic field to better retain an electronic device.

The channel 212 may include a first diagonal wall 276a and a second diagonal wall 276b, both of which are defined in part by the first layer 248a, the second layer 248b, and the third layer 248c. As shown, the first diagonal wall 276a is separated from the second diagonal wall 276b by an angle 280. The angle 280 may be approximately in the range of 70 to 110 degrees. In some embodiments, the angle 280 is 90 degrees. In some embodiments, the angle 280 is 91.5 degrees. The angle 280 may be slightly larger than an angle between a back wall and a sidewall of a housing of an electronic device (such as the electronic device 180, shown in FIG. 1).

Figure 9B:
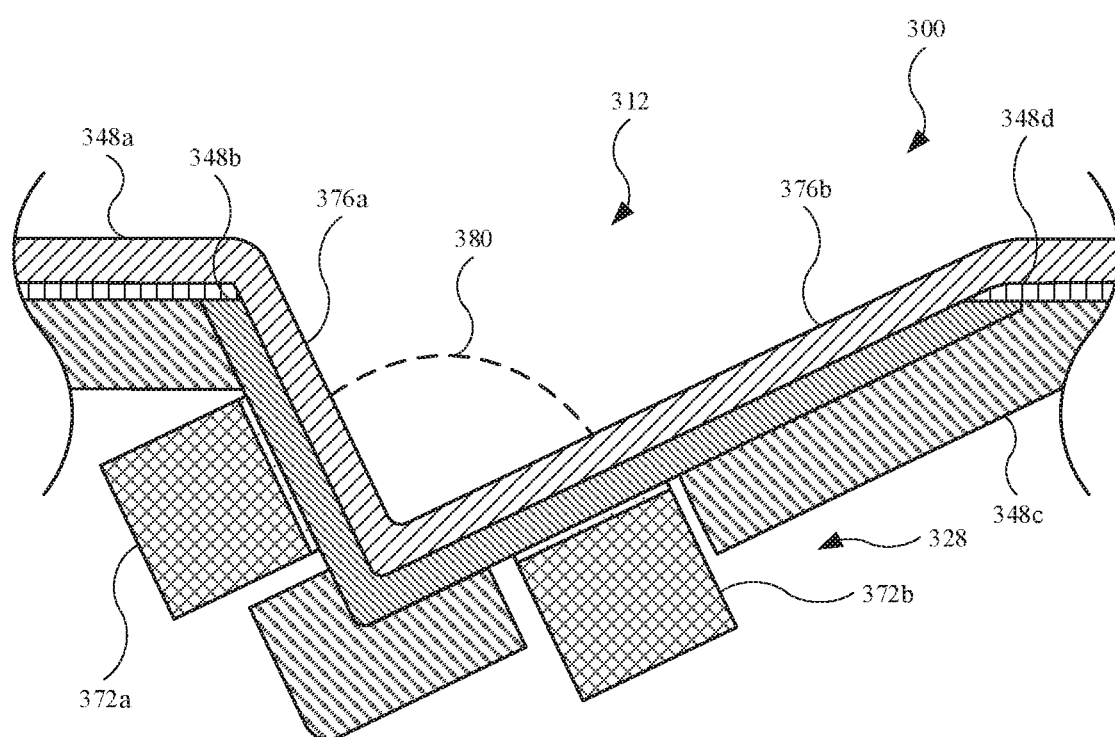
FIG. 9B illustrates a cross sectional view of an alternate embodiment of an accessory device, showing an alternate configuration of a channel of the accessory device, in accordance with some described embodiments.

FIG. 9B illustrates a cross sectional view of an alternate embodiment of an accessory device 300, showing an alternate configuration of a channel 312 of the accessory device 300, in accordance with some described embodiments. The accessory device 300 may include a first layer 348a, a second layer 348b, and a third layer 348c that may include any materials and features described for the first layer 248a, the second layer 248b, and the third layer 248c, respectively (shown in FIG. 9A). The accessory device 300 may include a layer 348d that terminates at the channel 312. The layer 348d may include any materials and features described for the layer 248d (shown in FIG. 9A). The third layer 348c may include openings to receive a first magnet 372a and a second magnet 372b of a magnetic assembly 328. The third layer 348c and the magnetic assembly 328 may include any features shown and described for the third layer 248c and the magnetic assembly 228, respectively, shown in FIG. 9A.

The channel 312 may include a first diagonal wall 376a and a second diagonal wall 376b, both of which are defined in part by the first layer 348a, the second layer 348b, and the third layer 348c. As shown, the first diagonal wall 376a is separated from the second diagonal wall 376b by an angle 380, which may include any angle described for the angle 280 (shown in FIG. 9A). While the first diagonal wall 276a and the second diagonal wall 276b (shown in FIG. 9A) are approximately the same size, the first diagonal wall 376a and the second diagonal wall 376b are different. For example, the first diagonal wall 376a is smaller than the second diagonal wall 376b. Also, the first diagonal wall 376a may be relatively steep as compared to the second diagonal wall 376b. As a result, an electronic device (such as the electronic device 180 shown in FIG. 1) may be positioned differently in the channel 312, as compared to the channel 212 (shown in FIG. 9A).

Figure 9C:
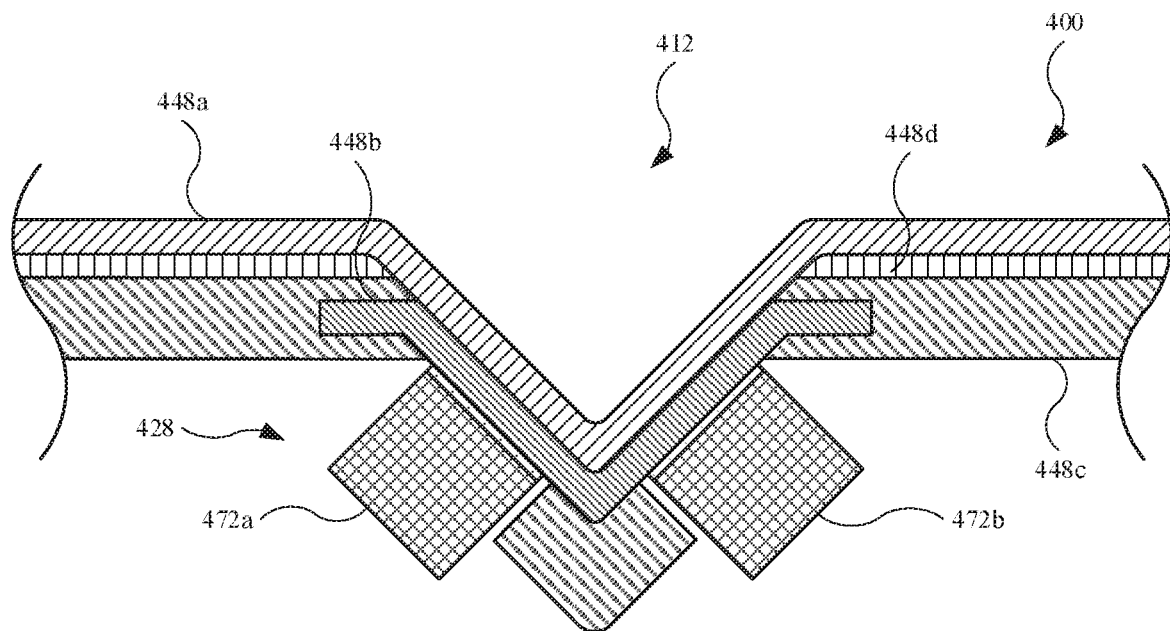
FIG. 9C illustrates a cross sectional view of an alternate embodiment of an accessory device, showing a channel with a material embedded in a layer, in accordance with some described embodiments.

FIG. 9C illustrates a cross sectional view of an alternate embodiment of an accessory device 400, showing an alternate configuration of a channel 412 of the accessory device 400, in accordance with some described embodiments. The accessory device 400 may include a first layer 448a, a second layer 448b, and a third layer 448c that may include any materials and features described for the first layer 248a, the second layer 248b, and the third layer 248c, respectively (shown in FIG. 9A). The accessory device 400 may include a layer 448d that terminates at the channel 412. The layer 448d may include any materials and features described for the layer 248d (shown in FIG. 9A). The third layer 448c may include openings to receive a first magnet 472a and a second magnet 472b of a magnetic assembly 428. The third layer 448c and the magnetic assembly 428 may include any features shown and described for the third layer 248c and the magnetic assembly 228, respectively, shown in FIG. 9A.

The second layer 448b may include different material, as compared to prior embodiments. For example, the second layer 448b may include a metal (or metal alloy), such as SUS stainless steel. Further, the second layer 448b may be molded to the third layer 448c by a molding operation, including an insert molding operation.

Figure 9D:
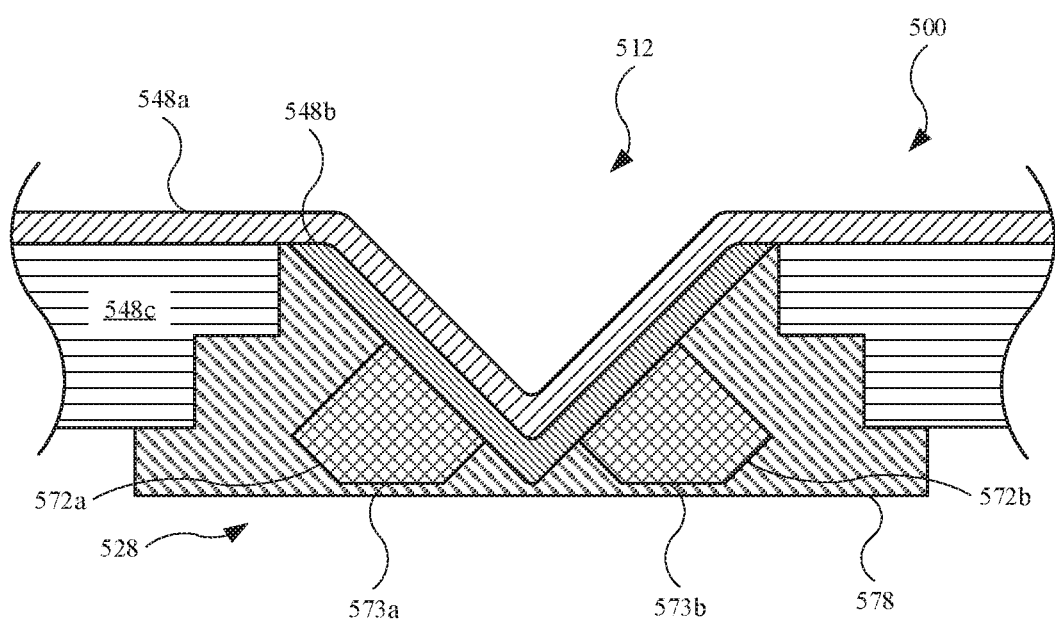
FIG. 9D illustrates a cross sectional view of an alternate embodiment of an accessory device, showing a channel and a molded insert installed at the channel.

FIG. 9D illustrates a cross sectional view of an alternate embodiment of an accessory device 500, showing a channel 512 and a molded insert 578 installed at the channel 512. The accessory device 500 may include a first layer 548a, a second layer 548b, and a third layer 548c that may include any materials and features described for the first layer 248a, the second layer 248b, and the third layer 248c, respectively (shown in FIG. 9A). The molded insert 578 may carry the second layer 548b and a magnetic assembly 528, which includes a first magnet 572a and a second magnet 572b. In this regard, the second layer 548b and the magnetic assembly 528 can be molded into the molded insert 578, which may include a glass fiber material. The magnetic assembly 528 may include any features shown and described for the magnetic assembly 228 (shown in FIG. 9A). The third layer 548c may include a stepped configuration. In order to assemble the molded insert 578 with the accessory device 500, the molded insert 578 may include a corresponding stepped configuration.

The first magnet 572a and the second magnet 572b may include a chamfered region 573a and a chamfered region 573b, respectively. The chamfered regions reduce the overall size of their respective magnets in order to create an accessory device 500 that includes a reduced profile. Also, the chamfered regions represent less magnetic material, which may reduce the external magnetic fields of the magnets along a rear section (not shown in FIG. 9D) of the accessory device 500. The reduced external magnetic fields may prevent unwanted interference with magnetically sensitive objects, such as credit cards, placed on the rear section.

Figure 10:
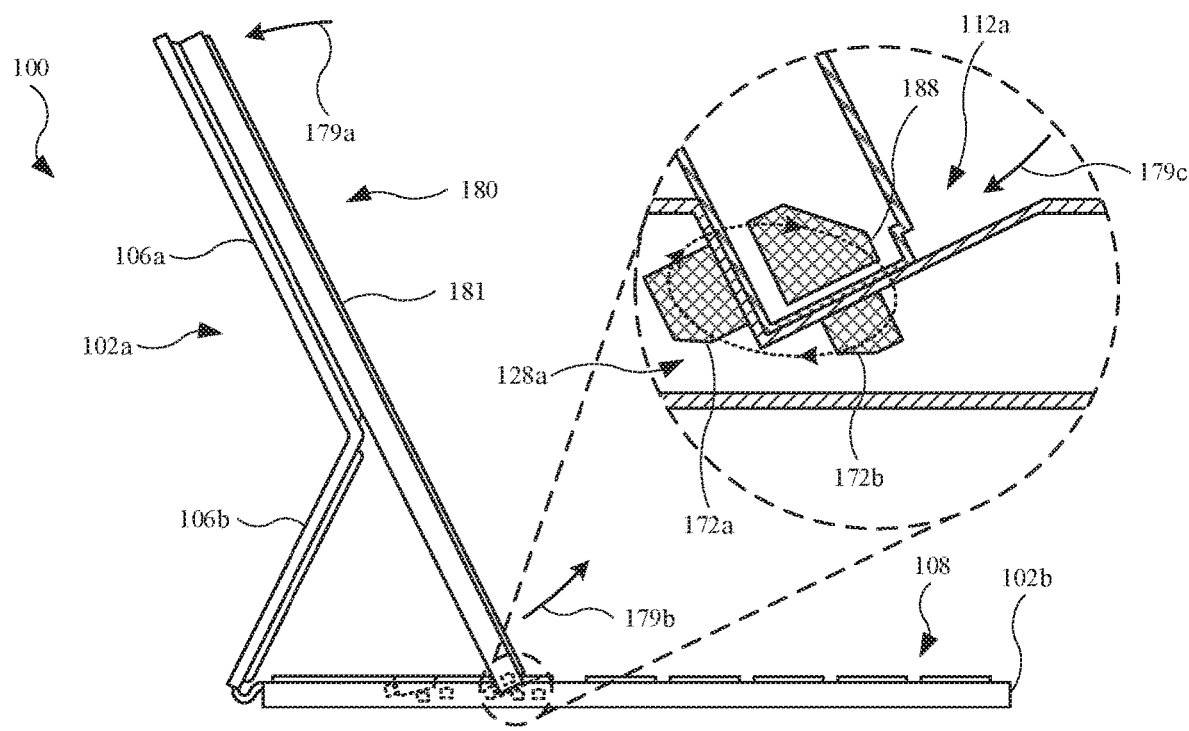
FIG. 10 illustrates a side view of the accessory device shown in FIG. 1, showing the electronic device coupled to the accessory device and positioned in the first channel, in accordance with some described embodiments.

FIG. 10 illustrates a side view of the accessory device 100 shown in FIG. 1, showing the electronic device 180 coupled to the accessory device 100 and positioned in the first channel 112a, in accordance with some described embodiments. As shown, the electronic device 180 includes a magnet 188 (or in some cases, multiple magnets) that is magnetically coupled with a first magnet 172a and a second magnet 172b of the magnetic assembly 128a. When a force (in the direction of an arrow 179a) is applied to the electronic device 180, a rotational force (in the direction of the arrow 179b) may cause the electronic device 180 to rotate and leave the first channel 112a. However, the magnetic assembly 128a may counter this rotational force. For example, the first magnet 172a may include a size and shape that is greater than that of the second magnet 172b. In this manner, the first magnet 172a may include a stronger external magnetic field as compared to that of the second magnet 172b. The relatively stronger external magnetic field of the first magnet 172a provides a force in the direction of an arrow 179c that is opposite to the force in the direction of the arrow 179b, thereby counteracting the rotational force. Also, the magnetic coupling between the magnet 188 and the second magnet 172b provides a force in the direction, or at least approximately in the direction, of gravity to maintain the electronic device 180 in the first channel 112a. It should be noted that the magnetic assembly 128b (shown in FIG. 2) may include a number of magnets and associated features described for the magnetic assembly 128a. Furthermore, the electronic device 180 may include an additional magnet similar to that of the magnet 188 that magnetically couple with the magnetic assembly 128a. It should be noted that the magnetic assembly 128b (shown in FIG. 2) may include a number of magnets and associated features described for the magnetic assembly 128a. Also, the magnet 188 (and any other magnets within the electronic device 180) may be referred to as a device magnet.

Figure 11:
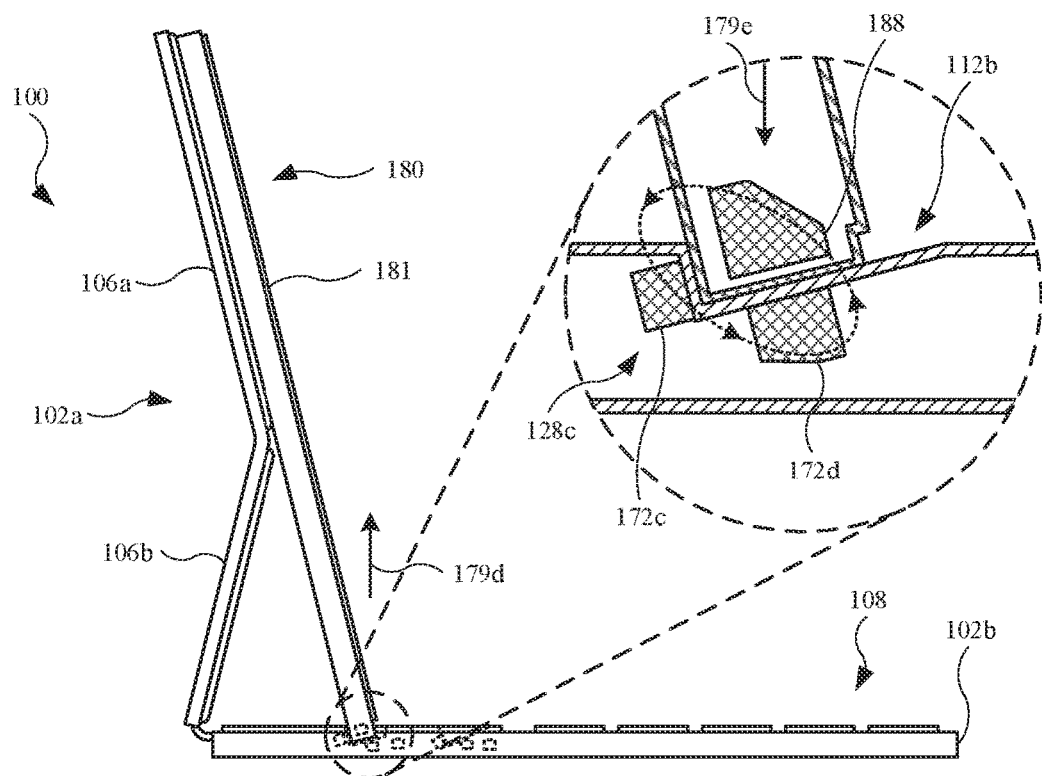
FIG. 11 illustrates a side view of the accessory device, showing the electronic device positioned in the second channel.

FIG. 11 illustrates a side view of the accessory device 100, showing the electronic device 180 positioned in the second channel 112b. As shown, the magnet 188 is magnetically coupled with a first magnet 172c and a second magnet 172d of the magnetic assembly 128c. When a force (in the direction of an arrow 179d) is applied to the electronic device 180, the electronic device 180 may be lifted out of the second channel 112b and away from the second section 102b. However, the magnetic assembly 128c may counter the force. For example, the second magnet 172d may include a size and shape that is greater than that of the first magnet 172c. In this manner, the second magnet 172d may include a stronger external magnetic field as compared to that of the first magnet 172c. The relatively stronger external magnetic field of the second magnet 172d provides a force in the direction of an arrow 179e that is opposite to the force in the direction of the arrow 179d, thereby counteracting the force. Also, the magnetic coupling between the magnet 188 in the electronic device 180 and the first magnet 172c provides a force to maintain the electronic device 180 in the second channel 112b. It should be noted that the magnetic assembly 128d (shown in FIG. 2) may include a number of magnets and associated features described for the magnetic assembly 128c. Furthermore, the electronic device 180 may include additional magnet similar to that of the magnet 188 that magnetically couple with the magnetic assembly 128d.

FIGS. 10 and 11 show the first section 102a supporting the electronic device 180 in an upright configuration such that a user can interact with both the keyboard 108 and the display 181. Further, the disparate size between the first segment 106a and the second segment 106b (that is, the first segment 106a being larger than the second segment 106b) allows the first section 102a to adjust, thereby allowing the electronic device 180 to be positioned in the first channel 112a and the second channel 112b. Also, the orientation of the magnet 188 and the magnets of the magnetic assembly 128a shown in FIG. 10 form a magnetic circuit in which the magnetic field is in a clockwise direction, while the orientation of the magnet 188 and the magnets of the magnetic assembly 128c shown in FIG. 11 form a magnetic circuit in which the magnetic field is in a counter-clockwise direction.

Also, referring to FIG. 2, the accessory device 100 includes a first sensor 132a and a second sensor 132b. When the electronic device 180 is in the first channel 112a, the first sensor 132a can detect an external magnetic field (not shown in FIG. 10) generated by a magnet in the electronic device 180, and provide an input to a processor circuit on the circuit board 156a (shown in FIG. 7), which can subsequently provide a command to activate the keyboard 108. Similarly, when the electronic device 180 is in the second channel 112b, the second sensor 132b can detect an external magnetic field (not shown in FIG. 11) generated by a magnet in the electronic device 180, and provide an input to a processor circuit on the circuit board 156a (shown in FIG. 7), which can subsequently provide a command to activate the keyboard 108. The processor circuit on the circuit board 156a can provide a command to deactivate the keyboard 108 when neither the first sensor 132a nor the second sensor 132b detect the magnet 188. By selectively activating and deactivating the keyboard 108, the keyboard 108 is active only when it can be accessed by a user and is inactive when it cannot. This may conserve battery power as well as prevent unwanted inputs (e.g., keystrokes) to the keyboard 108. Moreover, the keyboard 108 may be normally in a deactivated mode (i.e., inactive) until triggered or awakened using the first sensor 132a or the second sensor 132b.

FIGS. 12-19 show various configurations capable by the accessory device 100. Further, the various configurations of the accessory device 100 are attainable when the electronic device 180 is engaged with the accessory device 100 and retained by the accessory device 100 by magnetic coupling.

Figure 12:
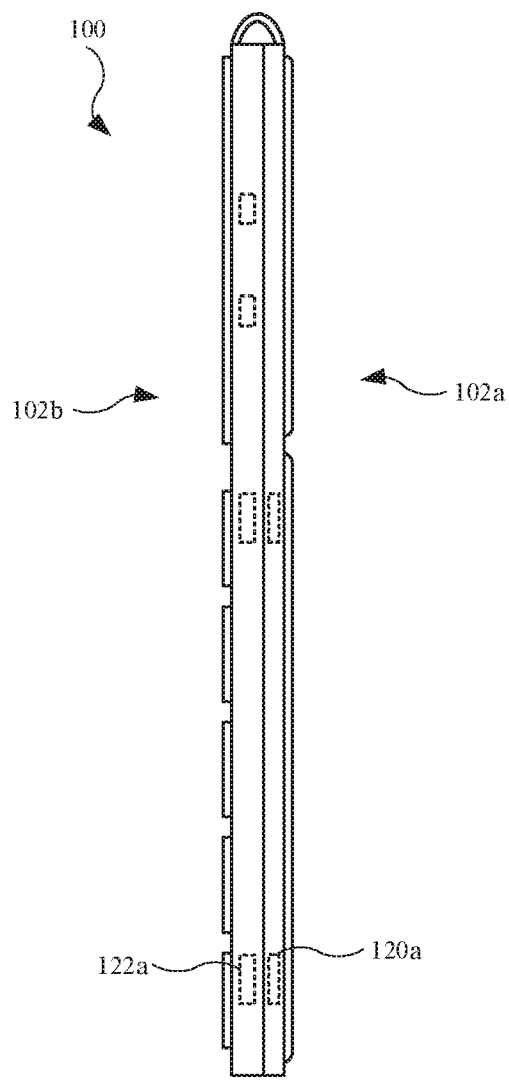
FIG. 12 illustrates a side view of the accessory device, showing the first section engaged with the second section.

FIG. 12 illustrates a side view of the accessory device 100, showing the first section 102a engaged with the second section 102b. As shown, a rear surface (or back surface) of the first section 102a is engaged with a rear surface (or back surface) of the second section 102b. The first section 102a can remain engaged with the second section 102b through magnet attraction between magnets in first section 102a and magnets in the second section 102b. For example, the magnet 120a in the first section 102a may magnetically couple with the magnet 122a in the second section 102b. Additional magnets (not shown in FIG. 12) in the first section 102a may magnetically couple with additional magnets (not shown in FIG. 12) in the second section 102b.

Figure 13:
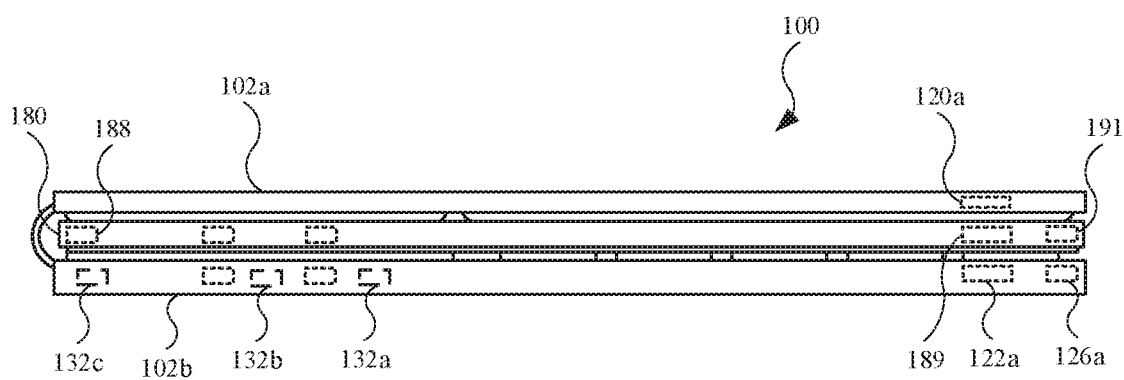
FIG. 13 illustrates a side view of the accessory device, showing the electronic device positioned between, and engaged with, the first section and the second section.

FIG. 13 illustrates a side view of the accessory device 100, showing the electronic device 180 positioned between, and engaged with, the first section 102a and the second section 102b. In order to maintain the engagement, magnets in the electronic device 180 may magnetically couple with magnets in both the first section 102a and the second section 102b. For example, the electronic device 180 includes a magnet 189 magnetically coupled with both the magnet 120a in the first section 102a and the magnet 122a in the second section 102b. Furthermore, the electronic device 180 may include a magnet 191 magnetically coupled with a magnet 126a located along an edge of the second section 102b. The electronic device 180 may include additional magnets (not shown in FIG. 13), with each additional magnet magnetically coupled with one of the magnet 126b, the magnet 126c, or the magnet 126d (shown in FIG. 2) in the second section 102b.

Also, in some instances, the first sensor 132a and/or the second sensor 132b may detect an external magnetic field generated from a magnet (or magnets) in the electronic device 180, thereby generating a subsequent command to activate the keyboard 108 (shown in FIG. 2), even though the keyboard 108 is inaccessible. However, the accessory device 100 may include a third sensor 132c capable of detecting an external magnetic field from the magnet 188 in the electronic device 180. The third sensor 132c can send an input to the processor circuit on the circuit board 156a (shown in FIG. 6) when the external magnetic field is detected. The processor circuit can then generate a command that deactivates the keyboard 108. In other words, an input from the third sensor 132c can override inputs from the first sensor 132a and the second sensor 132b.

Figure 14:
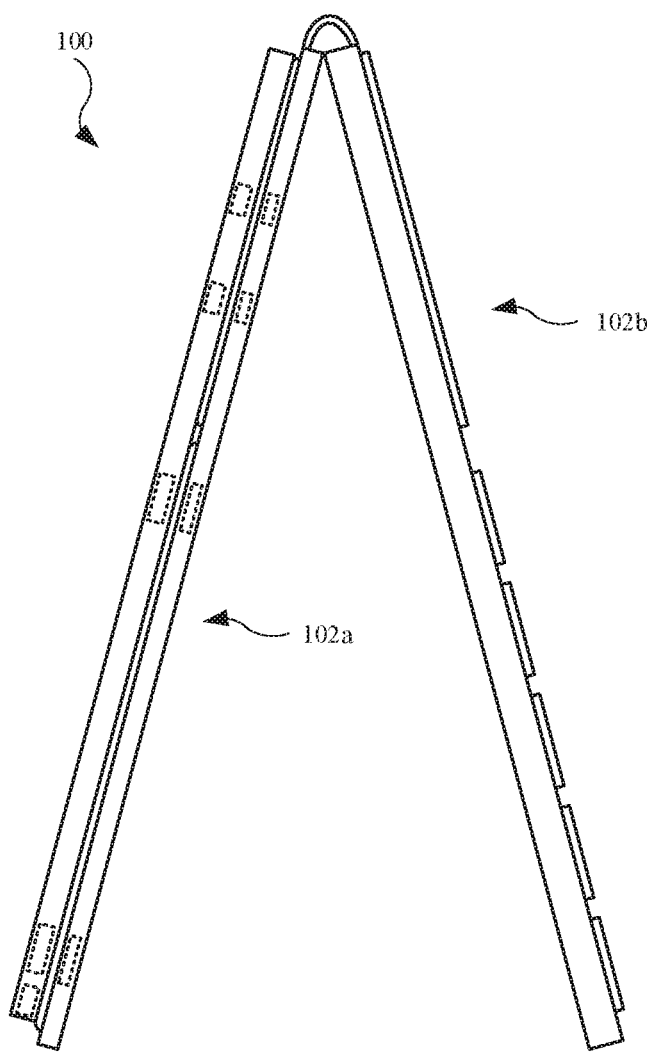
FIG. 14 illustrates a side view of the accessory device, showing the electronic device coupled to the first section, while the first section and the second section form a stand.

FIG. 14 illustrates a side view of the accessory device 100, showing the electronic device 180 coupled to the first section 102a, while the first section 102a and the second section 102b form a stand. As shown, the first section 102a is separated from the second section 102b to form a triangular stand. Also, the electronic device 180 is retained by the first section 102a through magnetic coupling between magnets (not labeled) in the electronic device 180 and magnets (not labeled) in the first section 102a.

Figure 15:
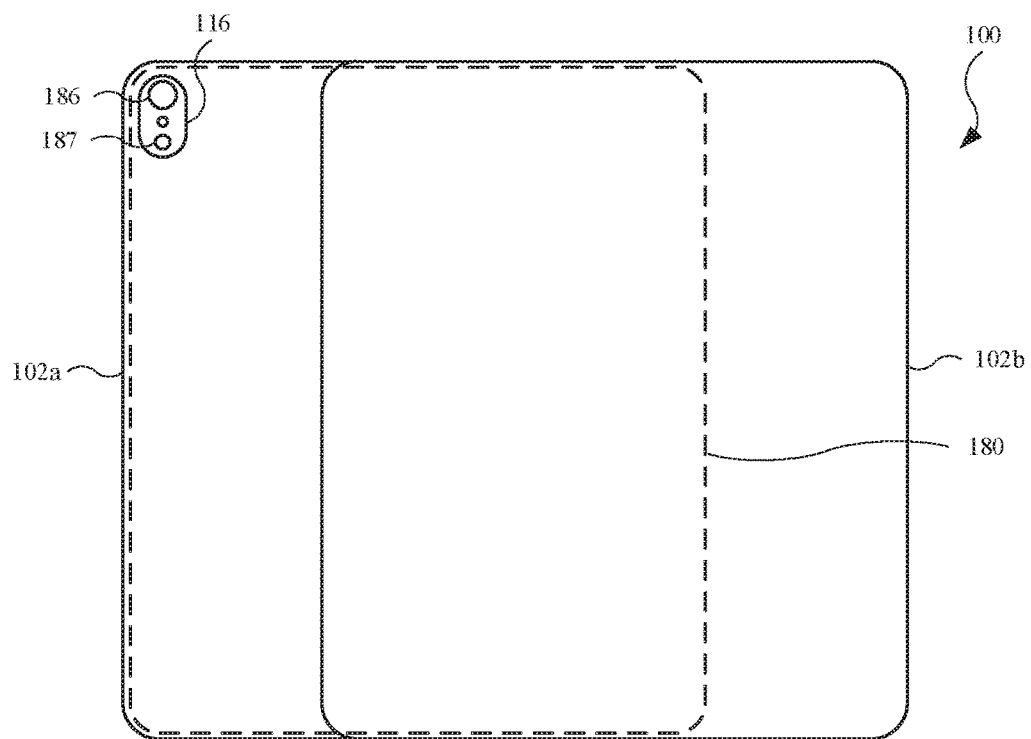
FIG. 15 illustrates a plan view of the accessory device, showing the first section partially extended laterally from the second section.

FIG. 15 illustrates a plan view of the accessory device 100, showing the first section 102a partially extended laterally from the second section 102b. As shown, the electronic device 180 (shown as a dotted line) is coupled to the first section 102a. The camera assembly 186 and the flash module 187 are aligned with the opening 116 in the first section 102a, and as a result, are unobstructed from the second section 102b, thereby allowing the camera assembly 186 to capture images and the flash module 187 to provide additional light.

Figure 16:
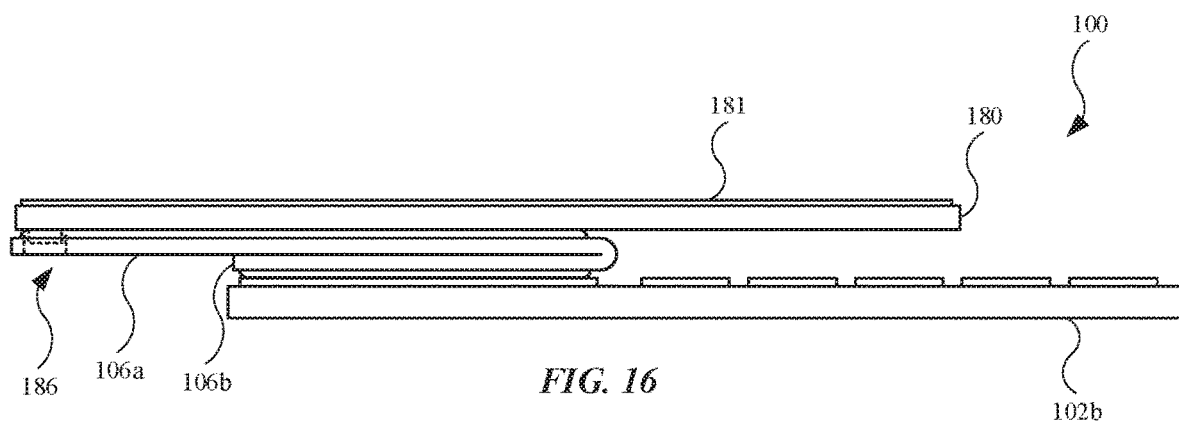
FIG. 16 illustrates a side view of the accessory device shown in FIG. 15, showing the first segment extending beyond the second segment.

FIG. 16 illustrates a side view of the accessory device 100 shown in FIG. 15, showing the first segment 106a extending beyond the second segment 106b. Based upon the disparate size between the first segment 106a and the second segment 106b, the first segment 106a extends laterally beyond the second section 102b. This allows for unobstructed image capturing by the camera assembly 186, as the second section 102b does not cover the first segment 106a. Also, the FIG. 16 shows a compact configuration of the accessory device 100 while still carrying the electronic device 180 in manner in which a user can interact with the display 181 (which may include a capacitive touch input display) in order to control the camera assembly 186 to capture images.

Figure 17:
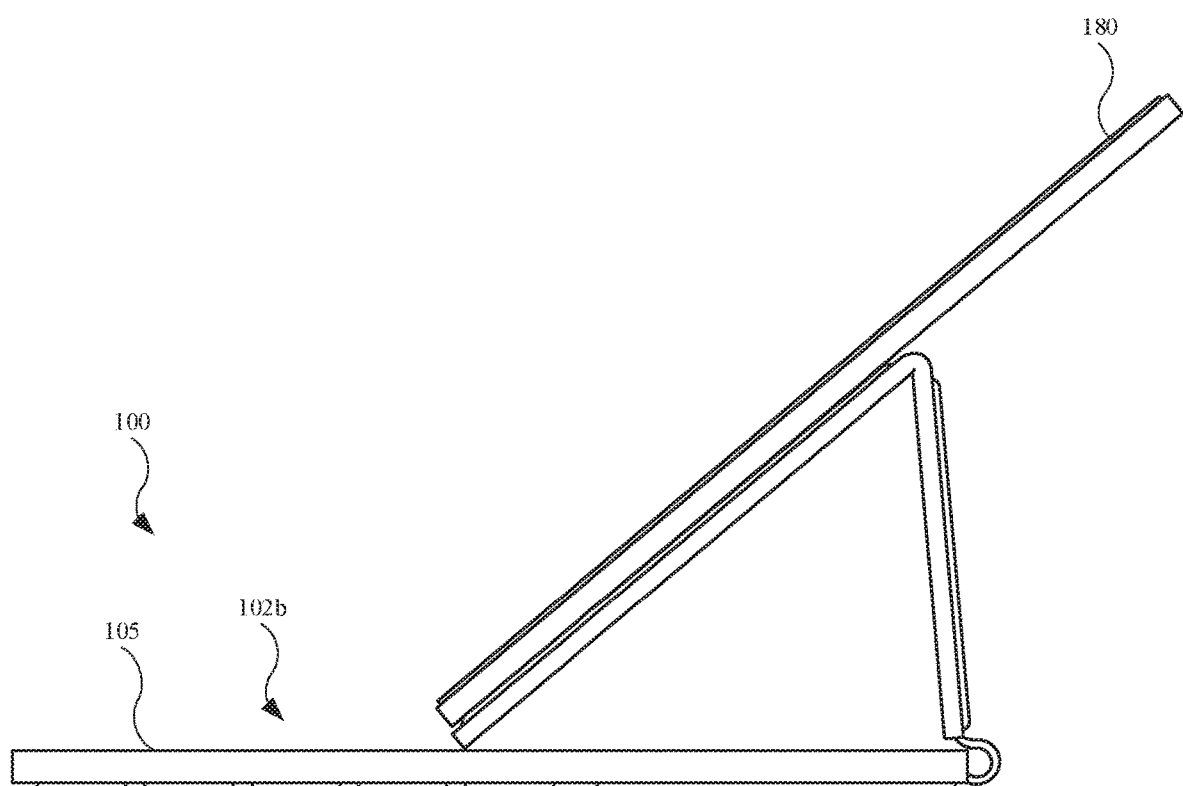
FIG. 17 illustrates a side view of the accessory device, showing the accessory device supporting the electronic device on a rear surface of the accessory device.

FIG. 17 illustrates a side view of the accessory device 100, showing the accessory device 100 supporting the electronic device 180 on a rear surface 105 of the accessory device 100. The rear surface 105 may include a rear surface of the second section 102b. As shown, the first segment 106a is capable of supporting the electronic device 180 without engagement between the second segment 106b and the electronic device 180. This allows the second segment 106b to form a support beam and define (along with the first segment 106a and the second section 102b) a triangular support. The first segment 106a may be magnetically coupled with the electronic device 180 through magnets (not shown in FIG. 17) in first segment 106a and the electronic device 180.

Figure 18:
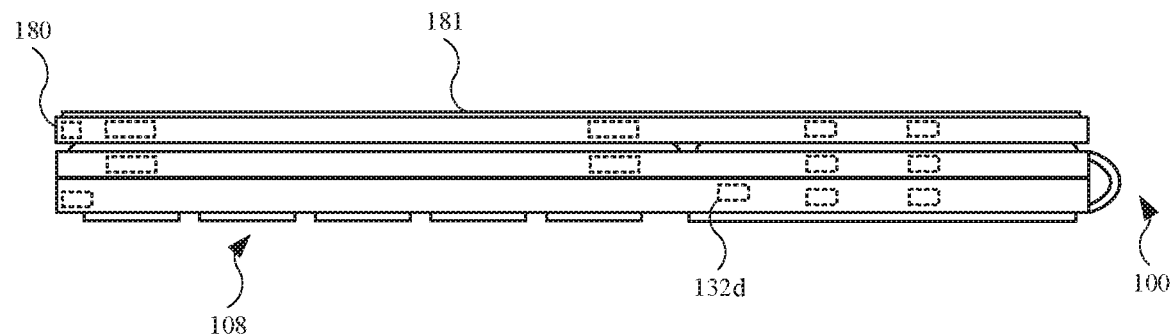
FIG. 18 illustrates a side view of the accessory device, showing the accessory device supporting the electronic device in an alternate configuration.

FIG. 18 illustrates a side view of the accessory device 100, showing the accessory device 100 supporting the electronic device 180 in an alternate configuration. As shown, the electronic device 180 is engaged with the first segment 106a. The first segment 106a may be magnetically coupled with the electronic device 180 through magnets (not labeled in FIG. 18) in first segment 106a and the electronic device 180. The keyboard 108 is facing away from the display 181, which, in some instances, may trigger a deactivation of the keyboard 108 as both the display 181 and the keyboard 108 are generally not simultaneously visible by a user. However, a fourth sensor 132d may provide an input to the processor circuit on the circuit board 156a (shown in FIG. 7) denoting the absence of a detected external magnetic field, which may activate the keyboard 108. As a result, the keyboard 108 may be activated even when the keyboard 108 and the display 181 are facing away from each other.

Figure 19:
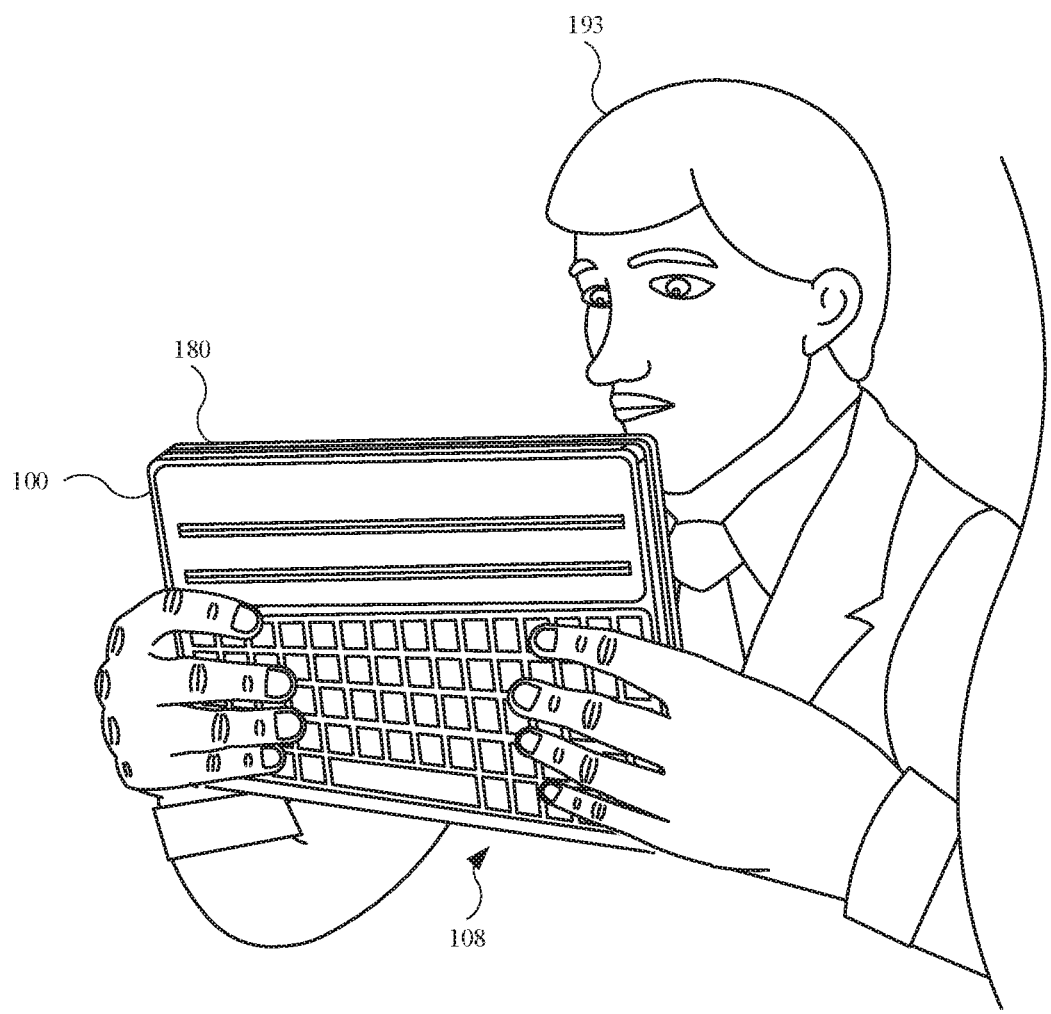
FIG. 19 illustrates a user interacting with the accessory device and electronic device in the configuration shown in FIG. 18.

FIG. 19 illustrates a user 193 interacting with the accessory device 100 and electronic device 180 in the configuration shown in FIG. 18. As shown, the user 193 can view the display 181 (shown in FIG. 18) while also using the keys of the keyboard 108, as the keyboard 108 is active. While the fourth sensor 132d (shown in FIG. 18) is generally described as a Hall Effect sensor, in some embodiments, the fourth sensor 132d is an accelerometer or an orientation sensor that determines the orientation of the accessory device 100 as shown in FIG. 19, thereby allowing the accessory device 100 to determine that the keyboard 108 is usable by the user 193. Also, the electronic device 180 may communicate to the accessory device 100 the type of software program(s) (not shown in FIG. 19) in use by the user 193 and displayed on the display 181 (shown in FIG. 18). For example, the software program may include a game in which the keyboard 108 is used a controller for the game, or a media player in which the keyboard 108 is used to control the media played by the media player. Accordingly, the electronic device 180 may notify the accessory device 100 that the keyboard 108 can be used with the software program.

Figure 20:
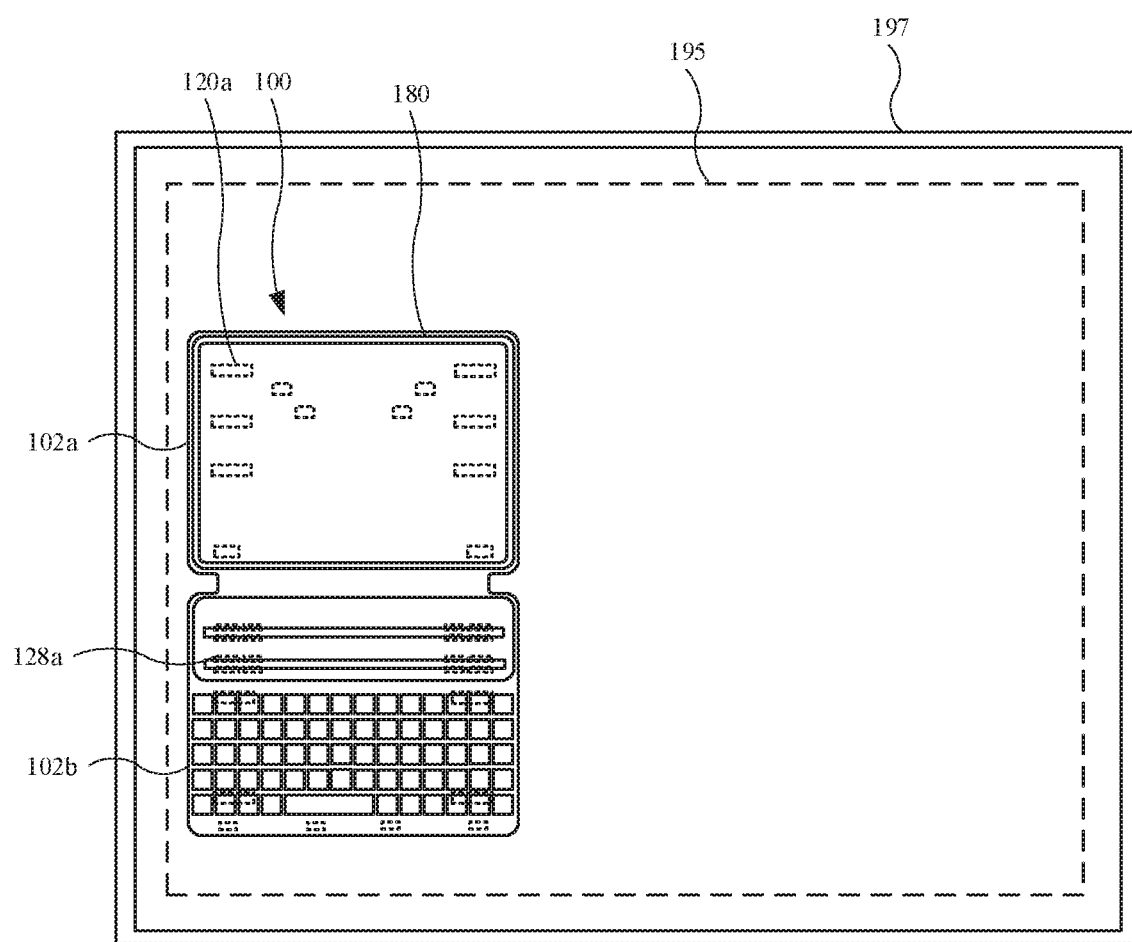
FIG. 20 illustrates the accessory device coupled with the electronic device, showing the accessory device engaged with, and suspended from, a magnetically attractable material using magnets in the accessory device.

FIG. 20 illustrates the accessory device 100 coupled with the electronic device 180, showing the accessory device 100 engaged with, and suspended from, a magnetically attractable material 195 using magnets in the accessory device 100. The magnetically attractable material 195 (shown as a dotted line) may be integrated with a chalkboard, a dry erase board, or refrigerator, as non-limiting examples. As shown, the magnetically attractable material 195 is integrated with a dry erase board 197 that is hung vertically. The accessory device 100 includes a sufficient number of magnets (such as the magnet 120a and the magnetic assembly 128a) that generate (collectively) an external magnetic field that can magnetically couple with the magnetically attractable material 195 and support the weight of the accessory device 100 and the electronic device 180, thereby countering gravitational forces. In some instances, the magnets in the first section 102a alone provide an external magnetic field sufficient to support the weight of the accessory device 100 and the electronic device 180. In some instances, the magnets in the second section 102b alone provide an external magnetic field sufficient to support the weight of the accessory device 100 and the electronic device 180.

Figure 21:
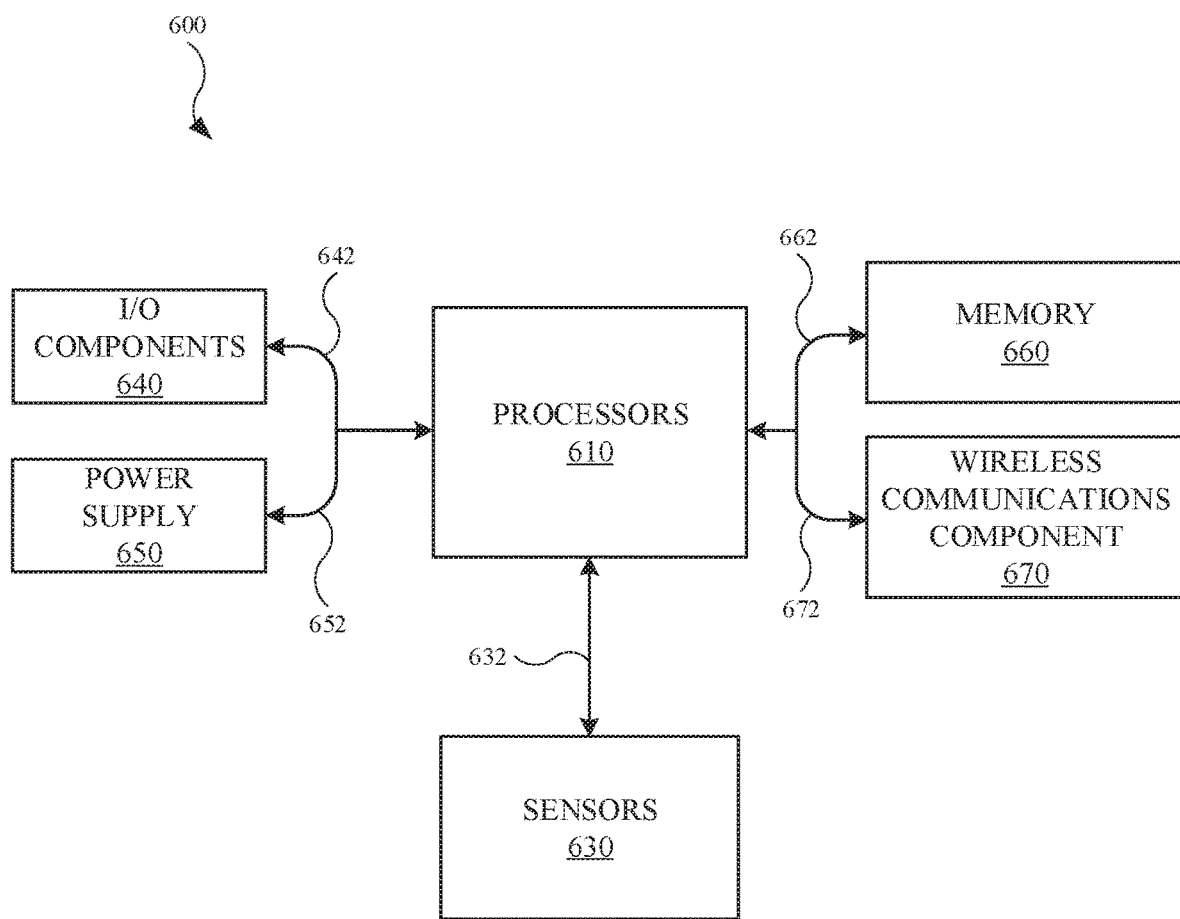
FIG. 21 illustrates a block diagram of an accessory device, in accordance with some described embodiments.

FIG. 21 illustrates a block diagram of an accessory device 600, in accordance with some embodiments. The accessory device 600 is capable of implementing the various techniques described herein. The accessory device 600 may include any features described herein for an accessory device. Further, the accessory device 100 (previously shown) may include any features described herein for the accessory device 600. Also, electronic devices described herein may include at least some features described for the accessory device 600. In this regard, the accessory device 600 and/or the electronic device 180 (shown in FIG. 1) may include one or more processors 610 for executing functions of the accessory device 600. The one or more processors 610 can refer to at least one of a central processing unit (CPU) and at least one microcontroller for performing dedicated functions.

According to some embodiments, the accessory device 600 can include one or more sensors 630 capable of detecting an orientation of the accessory device 600. In some examples, the one or more sensors 630 may include an accelerometer, an electronic gyroscope, or some other orientation sensor. In some embodiments, the one or more sensors 630 can determine whether the accessory device 600 is positioned in a manner that a user can use certain features (such as a keyboard) of the accessory device 600. In response, the one or more processors 610 can modify a notification that activates both the keyboard and an electronic device display coupled to the accessory device 600. The one or more sensors 630 can also include magnetic field sensors, such as Hall Effect sensors. The one or more sensors 630 is/are connected to the one or more processors 610 via one or more connection cables 632.

According to some embodiments, the accessory device 600 can include one or more input/output components 640 (also referred to as "I/O components") that enable communication between a user and the accessory device 600. In some cases, the one or more input/output components 640 can refer to a button or a switch that is capable of actuation by the user. In some examples, the one or more input/output components 640 can refer to a switch having a mechanical actuator (e.g., spring-based switch, slide-switch, rocker switch, rotating dial, etc.) or other moving parts that enable the switch to be actuated by the user. The one or more input/output components 640 can include an accelerometer that determines whether the accessory device 600, and to what extent, is accelerating or decelerating. When the one or more input/output components 640 are used, the one or more input/output components 640 can generate an electrical signal that is provided to the one or more processors 610 via one or more connection cables 642.

According to some embodiments, the accessory device 600 can include a power supply 650 that is capable of providing energy to the operational components of the accessory device 600. In some examples, the power supply 650 can refer to a rechargeable battery. The power supply 650 can be connected to the one or more processors 610 via one or more connection cables 652. The power supply 650 can be directly connected to other devices of the accessory device 600, such as the one or more input/output components 640. In some examples, the accessory device 600 can receive power from another power sources (e.g., an external charging device) not shown in FIG. 21.

According to some embodiments, the accessory device 600 can include memory 660, which can include a single disk or multiple disks (e.g., hard drives), and includes a storage management module that manages one or more partitions within the memory 660. In some cases, the memory 660 can include flash memory, semiconductor (solid state) memory or the like. The memory 660 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of the accessory device 600. In some embodiments, the memory 660 refers to a non-transitory computer readable medium, where an operating system ("OS") is established at the memory 660 that can be configured to execute software applications. The one or more processors 610 can also be used to execute software applications. In some embodiments, a data bus 662 can facilitate data transfer between the memory 660 and the one or more processors 610.

According to some embodiments, the accessory device 600 can include a wireless communications component 670. A network/bus interface 672 can couple the wireless communications component 670 to the one or more processors 610. The wireless communications component 670 can communicate with other electronic devices via any number of wireless communication protocols, including at least one of a global network (e.g., the Internet), a wide area network, a local area network, a wireless personal area network (WPAN), or the like. In some examples, the wireless communications component 670 can transmit data to the other electronic devices over IEEE 802.11 (e.g., a Wi-Fi® networking system), Bluetooth (IEEE 802.15.1), ZigBee, Wireless USB, Near-Field Communication (NFC), a cellular network system (e.g., a 3G/4G/5G network such as UMTS, LTE, etc.), or the like.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An accessory device for use with an electronic device, the accessory device comprising:
    a cover section that defines a receiving surface for the electronic device, the cover section comprising:
        electrical contacts located on the receiving surface, the electrical contacts configured to electrically couple to the electronic device,
        a first segment having a first size,
        a second segment rotatably coupled to the first segment, the second segment having a second size less than the first size;
    a cover magnet located in the cover section, the cover magnet capable of magnetically coupling with a device magnet in the electronic device; and
    a keyboard section rotatably coupled to the cover section, the keyboard section comprising a keyboard and a channel, the channel capable of receiving the electronic device when the electronic device is coupled to the cover section.

2. The accessory device of claim 1, further comprising a panel located in the first segment, the panel comprising:
    a first layer;
    a second layer; and
    a third layer, wherein the second layer comprises a foam layer positioned between the first layer and the third layer, the foam layer carrying the cover magnet.

3. The accessory device of claim 2, further comprising a reinforcement layer coupled with the foam layer, the reinforcement layer defining a through hole capable of receiving a camera assembly of the electronic device.

4. The accessory device of claim 1, further comprising:
    a first microfiber layer located on the first segment; and
    a second microfiber layer located on the second segment, the second microfiber layer separated from the first microfiber layer by hinge that allows the second segment to rotate with respect to the first segment.

5. The accessory device of claim 1, further comprising:
    a shell located in the keyboard section, the shell further comprising key openings in locations corresponding to keys of the keyboard, the shell at least partially defining the channel and a comprising channel opening at the channel; and
    a channel magnet located in the keyboard section, the channel magnet at least partially positioned in the channel opening.

6. The accessory device of claim 5, further comprising:
    a first layer that covers the channel; and
    a second layer covered by the first layer, the second layer covering the channel magnet and the channel opening.

7. The accessory device of claim 1, wherein the keyboard section includes:
    a first dimension measured from a rear surface of the keyboard section to a key of the keyboard,
    a second dimension measured from the rear surface of the keyboard section to a section that surrounds the channel, and
    the first dimension is equal to the second dimension.

8. An accessory device for use with an electronic device, the accessory device comprising:

a cover section that defines a receiving surface for the electronic device;
a keyboard section rotatably coupled to the cover section, the keyboard section comprising:
a keyboard,
a shell defining a channel capable of receiving the electronic device, the channel comprising:
key openings in locations corresponding to keys of the keyboard,
a first diagonal wall having a first channel opening, and
a second diagonal wall having a second channel opening,
a first magnet located along the first diagonal wall, and
a second magnet located along the second diagonal wall, wherein the first magnet and the second magnet magnetically couple with a device magnet of the electronic device when the electronic device is positioned in the channel;
a first layer that covers the keyboard section and the shell; and
a second layer that covers the shell.

9. The accessory device of claim 8, wherein the first magnet comprises a first external magnetic field and wherein the second magnet comprises a second external magnetic field that is less than the first external magnetic field.

10. The accessory device of claim 9, wherein the first external magnetic field and the second external magnetic field are capable of offsetting a force applied to the electronic device that otherwise causes the electronic device to rotate away from the keyboard section and out of the channel.

11. The accessory device of claim 8, further comprising:
a first opening formed in the shell, wherein the first magnet is located in the first opening;
a second opening formed in the shell, wherein the first magnet is located in the first opening; and
a third layer surrounding the shell.

12. The accessory device of claim 8, wherein the cover section comprises a first segment and a second segment separate from the first segment.

13. The accessory device of claim 12, further comprising a panel located in the first segment, the panel comprising:
a first layer;
a second layer; and
a third layer, wherein the second layer comprises a foam layer positioned between the first layer and the third layer, the foam layer carrying a cover magnet capable of magnetically coupling with a second device magnet of the electronic device.

14. The accessory device of claim 8, further comprising:
electrical contacts located on the receiving surface; and
an electrically conductive fabric electrically coupled to the electrical contacts and extending into the keyboard section.

15. An accessory device for use with an electronic device, the accessory device comprising:
a keyboard section comprising a keyboard and a channel, the channel capable of receiving the electronic device;
a cover section rotatably coupled to the keyboard section, the cover section comprising:
a receiving surface for the electronic device,
electrical contacts located on the receiving surface,
a flexible circuit that is coupled to the electrical contacts; and
a panel embedded in the cover section, the panel comprising:
a first layer,
a second layer comprising a foam layer,
a third layer, wherein the second layer is positioned between the first layer and the third layer,
an magnet embedded in the foam layer, the magnet capable of magnetically coupling with a device magnet of the electronic device when the electronic device is positioned on the receiving surface, and
a recess, wherein the flexible circuit is positioned in the recess.

16. The accessory device of claim 15, wherein the foam layer defines the recess, and wherein the second layer comprises an opening aligned with the recess.

17. The accessory device of claim 15, wherein the keyboard section comprises:
a circuit board; and
internal blocks that surround the circuit board.

18. The accessory device of claim 15, wherein the cover section comprises a segment that carries the electrical contacts, wherein:
the electrical contacts extend beyond the segment when the electronic device is not positioned on the segment, and
the segment compresses when the electronic device is positioned on the segment such that the electrical contacts are planar with respect to the segment or sub-flush with respect to the segment.

19. The accessory device of claim 15, wherein the cover section comprises:
a first segment having a first size; and
a second segment rotatably coupled to the first segment, the second segment having a second size less than the first size.

20. The accessory device of claim 19, wherein the electrical contacts are located on the first segment.

* * * * *